US008506384B2

(12) United States Patent
Coleman et al.

(10) Patent No.: US 8,506,384 B2
(45) Date of Patent: Aug. 13, 2013

(54) MULTI-CARD BINGO GAME FEATURES

(75) Inventors: James Coleman, Reno, NV (US); M. Ali Saffari, Reno, NV (US); Mark Bansemer, Reno, NV (US); Bryan D. Wolf, Reno, NV (US)

(73) Assignee: IGT, Reno, NV (US)

( * ) Notice: Subject to any disclaimer, the term of this patent is extended or adjusted under 35 U.S.C. 154(b) by 1042 days.

(21) Appl. No.: 12/208,252

(22) Filed: Sep. 10, 2008

(65) Prior Publication Data

US 2009/0075715 A1 Mar. 19, 2009

Related U.S. Application Data

(60) Provisional application No. 61/066,137, filed on Sep. 18, 2007.

(51) Int. Cl.
*A63F 9/24* (2006.01)
*A63F 13/00* (2006.01)

(52) U.S. Cl.
USPC .................. 463/21; 463/16; 463/17; 463/18; 463/19; 463/20; 463/25

(58) Field of Classification Search
USPC ............................................... 463/16–21, 25
See application file for complete search history.

(56) References Cited

U.S. PATENT DOCUMENTS 3,628,259 A 12/1971 Kahn
4,033,588 A 7/1977 Watts
4,156,976 A 6/1979 Mikun
4,157,829 A 6/1979 Goldman et al.
4,332,389 A 6/1982 Loyd, Jr. et al.

(Continued)

FOREIGN PATENT DOCUMENTS

EP 0 769 769 A1 4/1997
EP 1 199 690 4/2002

(Continued)

OTHER PUBLICATIONS

US Office Action dated Jul. 2, 2009 issued in U.S. Appl. No. 10/925,710.

(Continued)

*Primary Examiner* — Arthur O. Hall
*Assistant Examiner* — Jasson Yoo
(74) *Attorney, Agent, or Firm* — Neal, Gerber & Eisenberg LLP

(57) ABSTRACT

After the main ball drop of a bingo game, a player may be given a free extra bingo number. A probability of awarding a free ball may be determined, at least in part, according to a desired paytable percentage for the bingo game (or vice versa). Some implementations of the invention provide multi-card bingo games. A player may be required to hit a predetermined pattern on more than one bingo card in order to obtain a progressive award. The number of hits in the pattern(s) and/or the number of bingo cards involved may be determined according to a desired progressive award size and/or a desired probability of obtaining the progressive award. Players may have an opportunity to purchase one or more additional bingo numbers after the main ball drop of a bingo game. A player may be provided the option of purchasing a block of more than one additional bingo number after the main ball drop. The player may be offered such a block at a discount, as compared to the price for purchasing the additional bingo numbers individually.

25 Claims, 15 Drawing Sheets

460

| 465 Free Extra Ball Odds | | | 470 Paytable % |
|---|---|---|---|
| 114 | In | 1000 | 85.0101% |
| 180 | In | 1000 | 86.0081% |
| 246 | In | 1000 | 87.0062% |
| 312 | In | 1000 | 88.0043% |
| 378 | In | 1000 | 89.0023% |
| 444 | In | 1000 | 90.0004% |
| 511 | In | 1000 | 91.0136% |
| 577 | In | 1000 | 92.0116% |
| 643 | In | 1000 | 93.0097% |
| 709 | In | 1000 | 94.0077% |
| 775 | In | 1000 | 95.0058% |

(56) References Cited

U.S. PATENT DOCUMENTS 4,335,809 A 6/1982 Wain
4,339,798 A 7/1982 Hedges et al.
4,365,810 A 12/1982 Richardson
4,371,169 A 2/1983 Compton
4,373,726 A 2/1983 Churchill et al.
4,448,419 A 5/1984 Telnaes
4,455,025 A 6/1984 Itkis
4,467,424 A 8/1984 Hedges et al.
4,494,197 A 1/1985 Troy et al.
4,560,171 A 12/1985 Anthony
4,582,324 A 4/1986 Koza et al.
4,611,811 A 9/1986 Haase et al.
4,624,462 A 11/1986 Itkis
4,652,998 A 3/1987 Koza et al.
4,661,906 A 4/1987 DiFrancesco et al.
4,669,730 A 6/1987 Small
4,689,742 A 8/1987 Troy et al.
4,711,454 A 12/1987 Small
4,743,022 A 5/1988 Wood
4,747,600 A 5/1988 Richardson et al.
4,775,155 A 10/1988 Lees
4,798,387 A 1/1989 Richardson
4,805,907 A 2/1989 Hagiwara
4,815,741 A 3/1989 Small
4,817,951 A 4/1989 Crouch et al.
4,842,278 A 6/1989 Markowicz
4,848,771 A 7/1989 Richardson
4,856,787 A 8/1989 Itkis
4,875,686 A 10/1989 Timms
4,982,337 A 1/1991 Burr et al.
5,005,840 A 4/1991 Schwartz et al.
5,007,649 A 4/1991 Richardson
5,011,159 A 4/1991 Fortunato et al.
5,042,809 A 8/1991 Richardson
5,043,887 A 8/1991 Richardson et al.
5,046,737 A 9/1991 Fienberg
5,072,381 A 12/1991 Richardson et al.
5,092,598 A 3/1992 Kamille
5,100,137 A 3/1992 Fulton
5,100,139 A 3/1992 Di Bella
5,116,049 A 5/1992 Sludikoff
5,145,182 A 9/1992 Swift et al.
5,158,293 A 10/1992 Mullins
5,167,413 A 12/1992 Fulton
5,224,706 A 7/1993 Bridgeman et al.
5,242,163 A 9/1993 Fulton
5,265,874 A 11/1993 Dickinson et al.
5,275,400 A 1/1994 Weingardt et al.
5,276,312 A 1/1994 McCarthy
5,282,620 A 2/1994 Keesee
5,294,120 A 3/1994 Schultz
5,294,128 A 3/1994 Marquez
5,297,802 A 3/1994 Pocock et al.
5,324,035 A 6/1994 Morris et al.
5,351,970 A 10/1994 Fioretti
5,356,140 A 10/1994 Dabrowski et al.
5,393,057 A 2/1995 Marnell, II
5,398,932 A 3/1995 Eberhardt et al.
5,401,023 A 3/1995 Wood
5,401,024 A 3/1995 Simunek
5,407,199 A 4/1995 Gumina
5,419,592 A 5/1995 Stuart et al.
5,482,289 A 1/1996 Weingardt
5,489,101 A 2/1996 Moody
5,511,781 A 4/1996 Wood et al.
5,531,448 A 7/1996 Moody
5,542,669 A 8/1996 Charron et al.
5,569,083 A 10/1996 Fioretti et al.
5,570,885 A 11/1996 Ornstein
5,584,486 A 12/1996 Franklin
5,586,937 A 12/1996 Menashe
5,588,913 A 12/1996 Hecht
5,593,161 A 1/1997 Boylan et al.
5,624,119 A 4/1997 Leake
5,628,684 A 5/1997 Boudec
5,630,754 A 5/1997 Rebane
5,639,088 A 6/1997 Schneider et al.
5,639,089 A 6/1997 Matsumoto et al.
5,647,798 A 7/1997 Falciglia
5,651,735 A 7/1997 Baba
5,674,128 A 10/1997 Holch et al.
5,678,001 A 10/1997 Nagel et al.
5,679,077 A 10/1997 Pocock et al.
5,687,971 A 11/1997 Khaladkar
5,707,285 A 1/1998 Place et al.
5,711,715 A 1/1998 Ringo et al.
5,718,431 A 2/1998 Ornstein
5,718,631 A 2/1998 Invencion
5,722,891 A 3/1998 Inoue
5,727,786 A 3/1998 Weingardt et al.
5,732,950 A 3/1998 Moody
5,743,526 A 4/1998 Inoue
5,755,619 A 5/1998 Matsumoto et al.
5,762,552 A 6/1998 Vuong et al.
5,775,692 A 7/1998 Watts et al.
5,779,545 A 7/1998 Berg et al.
5,791,987 A 8/1998 Chen et al.
5,800,269 A 9/1998 Holch et al.
5,816,916 A 10/1998 Moody
5,823,534 A 10/1998 Bayai et al.
5,823,873 A 10/1998 Moody
5,823,874 A 10/1998 Adams
5,833,537 A 11/1998 Barrie
5,833,540 A 11/1998 Miodunski et al.
5,848,932 A 12/1998 Adams
5,851,011 A 12/1998 Lott
5,857,911 A 1/1999 Fioretti et al.
5,868,619 A 2/1999 Wood et al.
5,871,398 A 2/1999 Schneier et al.
5,882,258 A 3/1999 Kelly et al.
5,882,260 A 3/1999 Marks et al.
5,909,875 A 6/1999 Weingardt et al.
5,935,001 A 8/1999 Baba et al.
5,935,002 A * 8/1999 Falciglia ......................... 463/19
5,944,606 A 8/1999 Gerow
5,945,655 A 8/1999 Gilgeous et al.
5,949,042 A 9/1999 Dietz et al.
5,951,396 A 9/1999 Tawil
5,954,335 A 9/1999 Moody
5,954,582 A 9/1999 Zach
5,976,016 A 11/1999 Moody et al.
5,984,310 A 11/1999 English
5,984,779 A 11/1999 Bridgeman et al.
6,007,066 A 12/1999 Moody
6,007,424 A 12/1999 Evers et al.
6,012,720 A 1/2000 Webb
6,012,981 A 1/2000 Fujioka et al.
6,012,984 A 1/2000 Roseman
6,017,032 A 1/2000 Grippo et al.
6,024,640 A 2/2000 Walker et al.
6,062,980 A 5/2000 Luciano
6,062,981 A 5/2000 Luciano
6,079,711 A 6/2000 Wei et al.
6,089,982 A 7/2000 Holch et al.
6,093,100 A 7/2000 Singer et al.
6,098,985 A 8/2000 Moody
6,099,407 A 8/2000 Parker et al.
6,102,400 A 8/2000 Scott et al.
6,120,378 A 9/2000 Moody et al.
6,126,541 A 10/2000 Fuchs
6,126,542 A 10/2000 Fier
6,132,311 A 10/2000 Williams
6,146,271 A 11/2000 Kadlic
6,146,272 A 11/2000 Walker et al.
6,149,156 A 11/2000 Feola
6,149,521 A 11/2000 Sanduski
6,159,095 A 12/2000 Frohm et al.
6,168,521 B1 1/2001 Luciano et al.
6,174,233 B1 1/2001 Sunaga et al.
6,183,361 B1 2/2001 Cummings et al.
6,190,255 B1 2/2001 Thomas et al.
6,196,547 B1 3/2001 Pascal et al.
6,203,429 B1 3/2001 Demar et al.
6,210,275 B1 4/2001 Olsen

| | | | |
|---|---|---|---|
| 6,210,276 | B1 | 4/2001 | Mullins |
| 6,217,448 | B1 | 4/2001 | Olsen |
| 6,220,961 | B1 | 4/2001 | Keane et al. |
| 6,241,606 | B1 | 6/2001 | Riendeau et al. |
| 6,250,685 | B1 | 6/2001 | Walker et al. |
| 6,254,480 | B1 | 7/2001 | Zach |
| 6,257,980 | B1 | 7/2001 | Santini, Jr. |
| 6,273,424 | B1 | 8/2001 | Breeding |
| 6,273,820 | B1 | 8/2001 | Haste, III |
| 6,280,325 | B1 | 8/2001 | Fisk |
| 6,280,328 | B1 | 8/2001 | Holch et al. |
| 6,290,603 | B1 | 9/2001 | Luciano, Jr. |
| 6,309,298 | B1 | 10/2001 | Gerow |
| 6,312,334 | B1 | 11/2001 | Yoeloff |
| 6,315,290 | B1 | 11/2001 | Roethel |
| 6,315,291 | B1 | 11/2001 | Moody |
| 6,325,716 | B1 | 12/2001 | Walker et al. |
| 6,358,151 | B1 | 3/2002 | Enzminger et al. |
| 6,364,313 | B1 | 4/2002 | Moody |
| 6,368,213 | B1 | 4/2002 | McNabola |
| 6,368,214 | B1 | 4/2002 | Luciano |
| 6,368,218 | B2 | 4/2002 | Angell, Jr. |
| 6,394,456 | B1 | 5/2002 | Long |
| 6,398,644 | B1 | 6/2002 | Perrie et al. |
| 6,398,645 | B1 | 6/2002 | Yoseloff |
| 6,398,646 | B1 | 6/2002 | Wei et al. |
| 6,402,614 | B1 | 6/2002 | Schneier et al. |
| 6,419,583 | B1 | 7/2002 | Crumby et al. |
| 6,425,823 | B1 | 7/2002 | Byrne |
| 6,425,824 | B1 | 7/2002 | Baerlocher et al. |
| 6,450,885 | B2 | 9/2002 | Schneier et al. |
| 6,454,648 | B1 | 9/2002 | Kelly et al. |
| RE37,885 | E | 10/2002 | Acres et al. |
| 6,468,156 | B1 | 10/2002 | Hughs-Baird et al. |
| 6,475,086 | B2 | 11/2002 | Zach |
| 6,478,677 | B1 | 11/2002 | Moody |
| 6,482,088 | B2 | 11/2002 | Santini, Jr. |
| 6,494,454 | B2 | 12/2002 | Adams |
| 6,508,711 | B1 | 1/2003 | Ono |
| 6,511,068 | B1 | 1/2003 | Sklansky et al. |
| 6,514,144 | B2 | 2/2003 | Riendeau et al. |
| 6,524,184 | B1 | 2/2003 | Lind et al. |
| 6,524,185 | B2 | 2/2003 | Lind |
| 6,527,638 | B1 | 3/2003 | Walker et al. |
| 6,533,660 | B2 | 3/2003 | Seelig et al. |
| 6,533,664 | B1 | 3/2003 | Crumby |
| 6,537,150 | B1 | 3/2003 | Luciano et al. |
| 6,554,283 | B2 | 4/2003 | Vancura et al. |
| 6,565,091 | B2 | 5/2003 | Weingardt |
| 6,569,013 | B1 | 5/2003 | Taylor |
| 6,569,017 | B2 | 5/2003 | Enzminger et al. |
| 6,575,467 | B1 | 6/2003 | Kal |
| 6,581,935 | B1 | 6/2003 | Odom |
| 6,585,266 | B1 | 7/2003 | Lovell |
| 6,585,590 | B2 | 7/2003 | Malone |
| 6,599,187 | B2 | 7/2003 | Gerow |
| 6,599,188 | B2 | 7/2003 | Hirsch et al. |
| 6,607,439 | B2 | 8/2003 | Schneier et al. |
| 6,607,440 | B2 | 8/2003 | Santini, Jr. |
| 6,609,973 | B1 | 8/2003 | Weiss |
| 6,609,974 | B2 | 8/2003 | Mead et al. |
| 6,612,927 | B1 | 9/2003 | Slomiany et al. |
| 6,619,660 | B2 | 9/2003 | Schaefer et al. |
| 6,645,072 | B1 | 11/2003 | Kellen |
| 6,656,044 | B1 | 12/2003 | Lewis |
| 6,656,045 | B2 | 12/2003 | Wei et al. |
| 6,676,126 | B1 | 1/2004 | Walker et al. |
| 6,685,562 | B1 | 2/2004 | Rantanen |
| 6,685,567 | B2 | 2/2004 | Cockerille et al. |
| 6,695,695 | B2 | 2/2004 | Angel |
| 6,712,693 | B1 | 3/2004 | Hettinger |
| 6,722,655 | B1 | 4/2004 | Camero |
| 6,729,621 | B2 | 5/2004 | Moody |
| 6,729,961 | B1 | 5/2004 | Millerschone |
| 6,733,385 | B1 | 5/2004 | Enzminger et al. |
| 6,739,970 | B2 | 5/2004 | Luciano |
| 6,743,102 | B1 | 6/2004 | Fiechter et al. |
| 6,749,500 | B1 | 6/2004 | Nelson et al. |
| 6,755,738 | B2 | 6/2004 | Glasson et al. |

| | | | | |
|---|---|---|---|---|
| 6,755,739 | B2 | 6/2004 | Santini, Jr. | |
| 6,780,108 | B1 | 8/2004 | Luciano et al. | |
| 6,802,776 | B2 | 10/2004 | Lind et al. | |
| 6,802,778 | B1 * | 10/2004 | Lemay et al. .................. | 463/42 |
| 6,805,629 | B1 | 10/2004 | Weiss | |
| 6,824,465 | B2 | 11/2004 | Luciano, Jr. | |
| 6,832,956 | B1 | 12/2004 | Boyd et al. | |
| 6,840,858 | B2 | 1/2005 | Adams | |
| 6,874,784 | B1 | 4/2005 | Promutico et al. | |
| 6,918,831 | B2 | 7/2005 | Nguyen et al. | |
| 6,921,334 | B1 * | 7/2005 | Bennett .......................... | 463/16 |
| 6,923,719 | B2 | 8/2005 | Wolf | |
| 6,932,707 | B2 | 8/2005 | Duhamel | |
| 7,059,966 | B2 | 6/2006 | Luciano, Jr. et al. | |
| 7,128,647 | B2 | 10/2006 | Muir | |
| 7,258,608 | B2 | 8/2007 | Khal | |
| 7,303,469 | B2 | 12/2007 | Kaminkow | |
| 7,306,519 | B2 | 12/2007 | Baerlocher | |
| 7,399,227 | B2 | 7/2008 | Michaelson et al. | |
| 7,480,857 | B2 | 1/2009 | Benbrahim et al. | |
| 7,481,707 | B1 | 1/2009 | Luciano et al. | |
| 7,515,718 | B2 | 4/2009 | Nguyen et al. | |
| 7,544,129 | B2 | 6/2009 | Baerlocher | |
| 7,563,167 | B2 | 7/2009 | Walker et al. | |
| 7,588,496 | B2 | 9/2009 | Van Asdale | |
| 7,682,241 | B2 | 3/2010 | Baerlocher | |
| 7,727,061 | B2 | 6/2010 | Taylor | |
| 7,740,534 | B2 | 6/2010 | Walker et al. | |
| 7,824,257 | B2 | 11/2010 | Jubinville et al. | |
| 7,828,648 | B2 | 11/2010 | Jackson | |
| 7,901,282 | B2 | 3/2011 | Cannon | |
| 8,002,621 | B2 | 8/2011 | Mattice et al. | |
| 8,025,561 | B2 | 9/2011 | Reddicks et al. | |
| 2001/0036855 | A1 | 11/2001 | DeFrees-Parrott et al. | |
| 2001/0046892 | A1 | 11/2001 | Santini, Jr. | |
| 2002/0010013 | A1 | 1/2002 | Walker et al. | |
| 2002/0045472 | A1 | 4/2002 | Adams | |
| 2002/0052231 | A1 | 5/2002 | Fioretti | |
| 2002/0058545 | A1 * | 5/2002 | Luciano .......................... | 463/18 |
| 2002/0094859 | A1 | 7/2002 | Hirsch et al. | |
| 2002/0094869 | A1 | 7/2002 | Harkham | |
| 2002/0098882 | A1 | 7/2002 | Lind et al. | |
| 2002/0098883 | A1 | 7/2002 | Packes, Jr. et al. | |
| 2002/0111207 | A1 | 8/2002 | Lind et al. | |
| 2002/0111214 | A1 | 8/2002 | Lind et al. | |
| 2002/0113369 | A1 | 8/2002 | Weingardt | |
| 2002/0117803 | A1 | 8/2002 | Weingardt | |
| 2002/0132661 | A1 | 9/2002 | Lind et al. | |
| 2002/0137562 | A1 | 9/2002 | Malone | |
| 2002/0155877 | A1 | 10/2002 | Enzminger et al. | |
| 2002/0169018 | A1 | 11/2002 | Schneier et al. | |
| 2002/0177478 | A1 | 11/2002 | Glasson et al. | |
| 2002/0196342 | A1 | 12/2002 | Walker et al. | |
| 2003/0017867 | A1 | 1/2003 | Dekeller | |
| 2003/0060257 | A1 | 3/2003 | Katz et al. | |
| 2003/0060261 | A1 | 3/2003 | Katz et al. | |
| 2003/0060276 | A1 | 3/2003 | Walker et al. | |
| 2003/0098544 | A1 | 5/2003 | Tarantino | |
| 2003/0119579 | A1 * | 6/2003 | Walker et al. .................. | 463/20 |
| 2003/0125101 | A1 | 7/2003 | Campo | |
| 2003/0127793 | A1 | 7/2003 | Adams | |
| 2003/0144050 | A1 | 7/2003 | Keaton et al. | |
| 2003/0162577 | A1 | 8/2003 | Hamud | |
| 2003/0171986 | A1 | 9/2003 | Itkis et al. | |
| 2003/0178771 | A1 | 9/2003 | Banyai | |
| 2003/0181231 | A1 | 9/2003 | Vancura et al. | |
| 2003/0181234 | A1 | 9/2003 | Falciglia, Sr. | |
| 2003/0190943 | A1 | 10/2003 | Walker et al. | |
| 2003/0193136 | A1 | 10/2003 | Walker et al. | |
| 2003/0195032 | A1 | 10/2003 | Enzminger et al. | |
| 2003/0216165 | A1 | 11/2003 | Singer et al. | |
| 2003/0228899 | A1 | 12/2003 | Evans | |
| 2003/0236116 | A1 | 12/2003 | Marks et al. | |
| 2004/0009806 | A1 | 1/2004 | Odom | |
| 2004/0023706 | A1 | 2/2004 | Hunter et al. | |
| 2004/0036212 | A1 | 2/2004 | Walker et al. | |
| 2004/0038723 | A1 | 2/2004 | Schneier et al. | |
| 2004/0048647 | A1 | 3/2004 | Lind et al. | |
| 2004/0053669 | A1 | 3/2004 | Gerrard et al. | |

| | | | |
|---|---|---|---|
| 2004/0053675 | A1 | 3/2004 | Nguyen et al. |
| 2004/0072604 | A1 | 4/2004 | Toyoda |
| 2004/0072605 | A1 | 4/2004 | Toyoda |
| 2004/0077400 | A1 | 4/2004 | Marshall |
| 2004/0106445 | A1 | 6/2004 | Perrie et al. |
| 2004/0121834 | A1 | 6/2004 | Libby et al. |
| 2004/0130096 | A1 | 7/2004 | Duhamel |
| 2004/0132523 | A1 | 7/2004 | Staw |
| 2004/0142747 | A1 | 7/2004 | Pryzby |
| 2004/0152499 | A1 | 8/2004 | Lind et al. |
| 2004/0152503 | A1 | 8/2004 | Lind et al. |
| 2004/0152505 | A1 | 8/2004 | Herrmann et al. |
| 2004/0152508 | A1 | 8/2004 | Lind et al. |
| 2004/0166920 | A1 | 8/2004 | Boyd et al. |
| 2004/0176169 | A1 | 9/2004 | Lind et al. |
| 2004/0178579 | A1 | 9/2004 | Lowell et al. |
| 2004/0185932 | A1 | 9/2004 | Lombardo |
| 2004/0204225 | A1 | 10/2004 | Campo et al. |
| 2004/0214626 | A1 | 10/2004 | Lind et al. |
| 2004/0219969 | A1 | 11/2004 | Casey et al. |
| 2004/0235542 | A1 | 11/2004 | Stronach et al. |
| 2004/0235555 | A1 | 11/2004 | Yarbrough et al. |
| 2004/0242310 | A1 | 12/2004 | Perkins |
| 2004/0251628 | A1 | 12/2004 | Kilby |
| 2004/0259621 | A1 | 12/2004 | Pfeiffer et al. |
| 2004/0266507 | A1 | 12/2004 | Cooper |
| 2004/0266509 | A1 | 12/2004 | Bennett et al. |
| 2005/0026665 | A1 | 2/2005 | Gerrard et al. |
| 2005/0037832 | A1 | 2/2005 | Cannon |
| 2005/0037834 | A1 | 2/2005 | Stern et al. |
| 0200/5054415 | | 3/2005 | Kaminkow et al. |
| 2005/0054404 | A1 | 3/2005 | Baerlocher |
| 2005/0054426 | A1 | 3/2005 | Toyoda |
| 2005/0059449 | A1 | 3/2005 | Yarbrough |
| 2005/0059467 | A1 | 3/2005 | Saffari et al. |
| 2005/0059468 | A1 | 3/2005 | Cannon |
| 2005/0059469 | A1 | 3/2005 | Gail et al. |
| 2005/0059470 | A1 | 3/2005 | Cannon |
| 2005/0059471 | A1 | 3/2005 | Cannon |
| 2005/0064932 | A1 | 3/2005 | Cannon |
| 2005/0075161 | A1 | 4/2005 | McGlone et al. |
| 2005/0096119 | A1 | 5/2005 | Lind et al. |
| 2005/0096123 | A1 | 5/2005 | Cregan et al. |
| 2005/0096130 | A1 | 5/2005 | Mullins |
| 2005/0101370 | A1 | 5/2005 | Lind et al. |
| 2005/0101387 | A1 | 5/2005 | Wolf |
| 2005/0119042 | A1 | 6/2005 | Chamberlain et al. |
| 2005/0130730 | A1 | 6/2005 | Lind et al. |
| 2005/0148382 | A1 | 7/2005 | Fox |
| 2005/0153778 | A1 | 7/2005 | Nelson et al. |
| 2005/0164771 | A1 | 7/2005 | Lind et al. |
| 2005/0164772 | A1 | 7/2005 | Lind et al. |
| 2005/0164773 | A1 | 7/2005 | Lind et al. |
| 2005/0167916 | A1 | 8/2005 | Banyai |
| 2005/0187014 | A1 | 8/2005 | Saffari et al. |
| 2005/0208992 | A1 | 9/2005 | Randall |
| 2005/0221883 | A1 | 10/2005 | Lind et al. |
| 2005/0227753 | A1 | 10/2005 | Luciano |
| 2005/0233798 | A1 | 10/2005 | Van Asdale et al. |
| 2005/0250572 | A1 * | 11/2005 | Kane et al. ...................... 463/17 |
| 2005/0255906 | A1 | 11/2005 | Lind et al. |
| 2005/0266919 | A1 | 12/2005 | Rowe et al. |
| 2006/0025189 | A1 | 2/2006 | Hollibaugh et al. |
| 2006/0025198 | A1 | 2/2006 | Gail et al. |
| 2006/0025199 | A1 | 2/2006 | Harkins et al. |
| 2006/0025207 | A1 * | 2/2006 | Walker et al. .................. 463/25 |
| 2006/0063594 | A1 | 3/2006 | Benbrahim |
| 2006/0084490 | A1 | 4/2006 | Khal |
| 2006/0121977 | A1 | 6/2006 | Odom |
| 2006/0160603 | A1 | 7/2006 | Lulek |
| 2006/0189375 | A1 | 8/2006 | Dodge |
| 2006/0217176 | A1 | 9/2006 | Walker et al. |
| 2006/0252515 | A1 | 11/2006 | Walker et al. |
| 2006/0258427 | A1 | 11/2006 | Rowe et al. |
| 2007/0004506 | A1 | 1/2007 | Kinsley et al. |
| 2007/0004510 | A1 | 1/2007 | Underdahl et al. |
| 2007/0021185 | A1 | 1/2007 | Walker et al. |
| 2007/0026935 | A1 | 2/2007 | Wolf et al. |
| 2007/0026942 | A1 | 2/2007 | Kinsley et al. |
| 2007/0060237 | A1 | 3/2007 | Rowe et al. |
| 2007/0060363 | A1 | 3/2007 | Nguyen et al. |
| 2007/0060394 | A1 | 3/2007 | Gowin et al. |
| 2007/0093286 | A1 | 4/2007 | Marshall |
| 2007/0117611 | A1 | 5/2007 | Dodge |
| 2007/0117623 | A1 | 5/2007 | Nelson et al. |
| 2007/0135211 | A1 | 6/2007 | Block et al. |
| 2007/0142113 | A1 | 6/2007 | Walker et al. |
| 2007/0298873 | A1 | 12/2007 | Nguyen et al. |
| 2008/0070663 | A1 | 3/2008 | Losilevsky |
| 2008/0102952 | A1 | 5/2008 | Walker et al. |
| 2008/0254894 | A1 | 10/2008 | Michaelson et al. |
| 2008/0305854 | A1 | 12/2008 | Graham et al. |
| 2009/0075714 | A1 | 3/2009 | Meyer et al. |
| 2009/0088239 | A1 | 4/2009 | Iddings et al. |
| 2009/0197664 | A1 | 8/2009 | Schultz |
| 2009/0265105 | A1 | 10/2009 | Davis et al. |
| 2010/0120489 | A1 | 5/2010 | Meyer |
| 2010/0210338 | A1 | 8/2010 | Taylor |
| 2011/0028201 | A1 | 2/2011 | Warner et al. |
| 2011/0034236 | A1 | 2/2011 | Jackson |

FOREIGN PATENT DOCUMENTS

| | | |
|---|---|---|
| EP | 1 302 914 | 4/2003 |
| EP | 1 341 135 | 9/2003 |
| EP | 1 343 125 | 9/2003 |
| WO | WO 96/18174 | 6/1996 |
| WO | WO 01/99067 | 12/2001 |
| WO | WO 03/063019 | 7/2003 |
| WO | WO 2004/095383 | 11/2004 |
| WO | WO 2007/075486 | 7/2007 |
| WO | WO 2009/039029 | 3/2009 |

OTHER PUBLICATIONS

US Office Action dated Jun. 27, 2007 issued in U.S. Appl. No. 11/026,860.

US Office Action dated Dec. 21, 2007 issued in U.S. Appl. No. 11/026,860.

US Office Action dated Jul. 9, 2008 issued in U.S. Appl. No. 11/026,860.

US Office Action dated Apr. 8, 2009 issued in U.S. Appl. No. 11/026,860.

US Office Action dated Apr. 29, 2008 issued in U.S. Appl. No. 11/031,048.

US Final Office Action dated Nov. 12, 2008 issued in U.S. Appl. No. 11/031,048.

US Office Action dated Jun. 12, 2009 issued in U.S. Appl. No. 11/031,048.

US Office Action dated Apr. 26, 2010 issued in U.S. Appl. No. 11/031,048.

US Office Action dated Mar. 17, 2008 issued in U.S. Appl. No. 10/937,227.

US Office Action dated Nov. 17, 2008 issued in U.S. Appl. No. 10/937,227.

US Final Office Action dated Jun. 17, 2009 issued in U.S. Appl. No. 10/937,227.

US Office Action dated Jan. 12, 2010 issued in U.S. Appl. No. 10/937,227.

US Office Action dated Sep. 12, 2007 issued in U.S. Appl. No. 10/969,127.

US Final Office Action dated Apr. 3, 2008 issued in U.S. Appl. No. 10/969,127.

US Office Action dated Sep. 16, 2008 issued in U.S. Appl. No. 10/969,127.

US Final Office Action dated Apr. 3, 2009 issued in U.S. Appl. No. 10/969,127.

US Pre-Brief Appeal Conference Decision dated Aug. 21, 2009 issued in U.S. Appl. No. 10/969,127.

US Office Action dated Dec. 22, 2009 issued in U.S. Appl. No. 10/969,127.

US Restriction Requirement dated Jun. 8, 2007 issued in U.S. Appl. No. 10/931,673.

US Office Action dated Aug. 20, 2007 issued in U.S. Appl. No. 10/931,673.

US Office Action dated Sep. 13, 2007 issued in U.S. Appl. No. 10/941,606.
US Office Action dated Jul. 3, 2007 issued in U.S. Appl. No. 10/755,982.
US Office Action dated Sep. 21, 2007 issued in U.S. Appl. No. 10/756,429.
US Office Action dated Sep. 9, 2011 issued in U.S. Appl. No. 12/118,966.
US Office Action dated Dec. 2, 2009 issued in U.S. Appl. No. 11/149,828.
US Office Action dated May 27, 2010 issued in U.S. Appl. No. 11/149,828.
US Office Action Final dated Oct. 26, 2010 issued in U.S. Appl. No. 11/149,828.
US Office Action (Notice of Panel Decision from Pre-Appeal Brief Review) dated Mar. 3, 2011 issued in U.S. Appl. No. 11/149,828.
US Examiner's Answer Before the Board of Patent Appeals and Interferences dated Jul. 26, 2011 issued in U.S. Appl. No. 11/149,828.
US Office Action (Reply Brief) dated Oct. 24, 2011 issued in U.S. Appl. No. 11/149,828.
US Office Action (Board of Patent Appeals and Interferences Docketing Notice) dated Nov. 1, 2011 issued in U.S. Appl. No. 11/149,828.
EP Examiner's Communication dated Jul. 3, 2006 issued in EP App No. 04783935.2.
EP Examination Report dated Oct. 22, 2007 issued in EP No. 04 788 725.2.
EP Examiner's Communication dated Oct. 25, 2006 issued in EP App No. 04784069.9.
PCT International Search Report and Written Opinion dated Feb. 3, 2005 issued in PCT/US2004/030285.
PCT International Search Report and Written Opinion dated Jan. 24, 2005 issued in PCT/US2004/030093.
EP Examiner's Communication dated Jul. 3, 2006 issued in EP App No. 04784071.5.
PCT International Search Report and Written Opinion dated Feb. 3, 2005 issued in PCT/US2004/029839.
PCT International Search Report and Written Opinion dated Jan. 11, 2005 issued in PCT/US2004/029912.
PCT International Search Report and Written Opinion dated Jul. 4, 2007 issued in PCT/US2006/047714.
PCT International Search Report dated Jun. 6, 2007 issued in PCT/US2006/048264.
PCT Written Opinion dated Jun. 6, 2007 issued in PCT/US2006/048264.
PCT International Search Report and Written Opinion dated Jan. 24, 2005 issued in PCT/US2004/029906.
PCT International Search Report and Written Opinion dated Jan. 25, 2005 issued in PCT/US2004/029913.
PCT International Search Report and Written Opinion dated Feb. 18, 2009 issued in PCT/US2008/076080.
PCT International Preliminary Report on Patentability and Written Opinion dated Mar. 24, 2010 issued in PCT/US2008/076080.
Mexican Office Action dated May 12, 2011 issued in Application No. 09/10539.
Mexican Second Office Action dated Feb. 17, 2012 issued in Application No. 09/10539.
Aho et al., (1983) "Data Structures and Algorithms", *Addison-Wesley*, 13-16, 56-57, 260-261 and 367.
Diamonopoly Advertisement by International Gamco, Inc. (2002); Electronic Tabs Advertisement by 21st Century Gaming (2002) 2 pages.
Encyclopedia > Suit (cards) NationMaster.com [online], [retrieved on Apr. 7, 2010]. Retrieved from the Internet <URL:http:www.statemaster.com/encyclopedia/Suit-(cards)>, 9 pages.
Hertzano, E., (1998) "*The Original Rummikub®*", Pressman Toy Corporation, New York, NY, (see joker rules), 5 pages.
Lucky Times California Lottery Newsletter published 1996; Instant Winner Advertisement by Williams/WMS Gaming, published prior to 2002, 4 pages.
Play it again Advertisement by International Gamco, Inc. (2000), 2 pages.
US Office Action Final dated Apr. 16, 2012 issued in U.S. Appl. No. 12/118,966.
US Advisory Action dated Jul. 13, 2012 issued in U.S. Appl. No. 12/118,966.

* cited by examiner

460

| 465 Free Extra Ball Odds | | | 470 Paytable % |
|---|---|---|---|
| 114 | in | 1000 | 85.0101% |
| 180 | in | 1000 | 86.0081% |
| 246 | in | 1000 | 87.0062% |
| 312 | in | 1000 | 88.0043% |
| 378 | in | 1000 | 89.0023% |
| 444 | in | 1000 | 90.0004% |
| 511 | in | 1000 | 91.0136% |
| 577 | in | 1000 | 92.0116% |
| 643 | in | 1000 | 93.0097% |
| 709 | in | 1000 | 94.0077% |
| 775 | in | 1000 | 95.0058% |

*FIG. 4C*

Mexico Multicard Bingo

500

Base Game

| | |
|---|---|
| Total Balls | 60 |
| Balls Drawn | 30 |
| Card Size | 15 |
| Max Cards | 4 |
| Max Bet Per Card | 10 |
| Max Bet | 40 |
| Hit Frequency | 15.8624% |

Payback Summary

| | |
|---|---|
| Minimum Payback% | 90.0004% |
| Maximum Payback % | 92.2920% |

Extra Ball

505

| | |
|---|---|
| Free Extra Ball Odds | 444 |
| in | 1000 |
| Max Extra Balls | 8 |
| Minimum Pattern Payout for Extra Balls | 30 |
| Suggested Max Payback for one Extra Ball | 94% |
| Freq. of One Card Triggering Extra Ball | 5.2963% |
| Freq. of Any Card Triggering Extra Ball | 20.6306% |

510

| Bet Level | Base | Prog. 2 | Prog. 3 |
|---|---|---|---|
| Min Bet / Card | 1 | 3 | 10 |
| Max Bet / Card | 2 | 9 | 10 |
| Base Payback % | 90.0004% | 90.0004% | 90.0004% |
| Prog. Payback % | 0.0000% | 2.2917% | 1.3750% |
| Total Payback % | 90.0004% | 92.2920% | 91.3754% |

| Pattern Number | Pattern | Name | Odds | Hit Frequency |
|---|---|---|---|---|
| Progressive 1 | X___X<br>XXXXX<br>X___X | Ache on 2 Cards | 1,782,471 | 0.000056% |
| Progressive 2 | _XXX_<br>X___X<br>_XXX_ | O on 2 Cards | 171,466 | 0.000583% |
| 32767 | XXXXX<br>XXXXX<br>XXXXX | Black Out | 242,136 | 0.000413% |
| 32447 | XXXXX<br>X_X_X<br>XXXXX | Ocho | 37,763 | 0.002648% |
| 32319 | XXXXX<br>X___X<br>XXXXX | Marko | 20,605 | 0.004853% |
| 18417 | X___X<br>XXXXX<br>X___X | Ache | 878 | 0.113946% |
| 32736 | XXXXX<br>XXXXX<br>_____ | Doble Linea 1 | 2,089 | 0.047863% |
| 31775 | XXXXX<br>_____<br>XXXXX | Doble Linea 2 | 2,478 | 0.040362% |
| 1023 | _____<br>XXXXX<br>XXXXX | Doble Linea 3 | 2,089 | 0.047863% |
| 21973 | X_X_X<br>_XXX_<br>X_X_X | XX | 878 | 0.113946% |
| 14894 | _XXX_<br>X___X<br>_XXX_ | O | 390 | 0.256166% |
| 16927 | X____<br>X____<br>XXXXX | L | 186 | 0.536390% |
| 31777 | XXXXX<br>____X<br>____X | Inverse L | 186 | 0.536390% |
| 31876 | XXXXX<br>__X__<br>__X__ | T | 184 | 0.542182% |
| 17732 | X___X<br>_X_X_<br>__X__ | V | 40 | 2.522136% |
| 4433 | __X__<br>_X_X_<br>X___X | Inverse V | 40 | 2.522136% |
| 31744 | XXXXX<br>_____<br>_____ | Linea 1 | 62 | 1.618700% |
| 992 | _____<br>XXXXX<br>_____ | Linea 2 | 41 | 2.441874% |
| 31 | _____<br>_____<br>XXXXX | Linea 3 | 49 | 2.035292% |
| 17425 | X___X<br>_____<br>X___X | 4 Corners | 19 | 5.390481% |
| | | | Total | 15.862418% |

515

520

| Base Paytable | Base Paytable+ Prog. 2 | Base Paytable 2+ Prog. 1 & 2 |
|---|---|---|
| 0 | 0 | 490,179 |
| 0 | 47,153 | 47,153 |
| 1500 | 1500 | 1500 |
| 750 | 750 | 750 |
| 250 | 250 | 250 |
| 100 | 100 | 100 |
| 75 | 75 | 75 |
| 75 | 75 | 75 |
| 75 | 75 | 75 |
| 50 | 50 | 50 |
| 30 | 30 | 30 |
| 10 | 10 | 10 |
| 10 | 10 | 10 |
| 5 | 5 | 5 |
| 4 | 4 | 4 |
| 4 | 4 | 4 |
| 2 | 2 | 2 |
| 2 | 2 | 2 |
| 2 | 2 | 2 |
| 1 | 1 | 1 |

*FIG. 5*

600

605 610 615 620 625

| Bet | 40 | | |
|---|---|---|---|
| Contribution | 0.125% | | |

| Odds | Progressive Size | Pattern Size | Cards |
|---|---|---|---|
| 1 | 0 | 1 | 2 |
| 1 | 620 0 | 1 | 1 |
| 1 | 0 | 2 | 1 |
| 2 | 0 | 1 | 3 |
| 2 | 0 | 3 | 1 |
| 3 | 0 | 2 | 2 |
| 5 | 0 | 4 | 1 |
| 10 | 0 | 5 | 1 |
| 15 | 1 | 3 | 2 |
| 18 | 1 | 1 | 4 |
| 21 | 1 | 6 | 1 |
| 22 | 1 | 2 | 3 |
| 48 | 2 | 7 | 1 |
| 74 | 4 | 4 | 2 |
| 109 | 5 | 8 | 1 |
| 258 | 13 | 9 | 1 |
| 263 | 13 | 3 | 3 |
| 420 | 21 | 5 | 2 |
| 437 | 22 | 2 | 4 |
| 627 | 31 | 10 | 1 |
| 1,568 | 78 | 11 | 1 |
| 2,699 | 135 | 6 | 2 |
| 4,045 | 202 | 12 | 1 |
| 4,061 | 203 | 4 | 3 |
| 10,786 | 539 | 13 | 1 |
| 16,179 | 809 | 3 | 4 |
| 19,883 | 994 | 7 | 2 |
| 29,820 | 1,491 | 14 | 1 |
| 85,732 | 4,287 | 15 | 1 |
| 85,785 | 4,289 | 5 | 3 |
| 171,466 | 8,573 | 8 | 2 |
| 282,722 | 14,136 | 4 Lines anywhere | |
| 1,028,783 | 51,439 | 4 | 4 |
| 1,782,471 | 89,124 | 9 | 2 |
| 2,673,823 | 133,691 | 6 | 3 |
| 23,253,134 | 1,162,657 | 10 | 2 |
| 139,518,802 | 6,975,940 | 5 | 4 |
| 139,518,884 | 6,975,944 | 7 | 3 |
| 403,054,318 | 20,152,716 | 11 | 2 |
| 459,989,116 | 22,999,456 | 5 Lines anywhere | |
| 10,119,542,330 | 505,977,117 | 12 | 2 |
| 15,179,313,495 | 758,965,675 | 8 | 3 |
| 60,717,253,980 | 3,035,862,699 | 6 | 4 |
| 425,020,777,862 | 21,251,038,893 | 13 | 2 |
| 5,419,014,917,745 | 270,950,745,887 | 9 | 3 |
| 39,739,442,730,128 | 1,986,972,136,506 | 14 | 2 |
| 127,991,971,390,543 | 6,399,598,569,527 | 6 Lines anywhere | |
| 238,436,656,380,769 | 11,921,832,819,039 | 7 | 4 |
| 19,710,763,594,143,600 | 985,538,179,707,179 | 15 | 2 |
| 29,566,145,391,215,400 | 1,478,307,269,560,770 | 10 | 3 |

*FIG. 6*

Four Card Bingo Progressives
Models the progressive jackpots for Four Card Bingo

805

| | |
|---|---|
| Total Balls | 60 |
| Balls Drawn | 30 |
| Card Size | 15 |
| Max Cards | 4 |

810

| | Progressive 1 | Progressive 1 |
|---|---|---|
| Pattern | x___x<br>xxxxx<br>x___x | _xxx_<br>x___x<br>_xxx_ |
| Description | Ache on 2 Cards | O on 2 Cards |
| Pattern Size | 9 | 8 |
| On How Many Cards | 2 | 2 |
| Odds | 1,782,471 | 171,466 |

815

| | | |
|---|---|---|
| Denomination (Pesos) | 1 | 1 |
| Required Cards Bet | 4 | 4 |
| Required Bet Per Card | 10 | 3 |
| Required Bet | 40 | 12 |
| Percent Contribution | 0.125% | 1.000% |
| Portion to Main Pool | 66.000% | 66.000% |
| Portion to Reserve Pool | 34.000% | 34.000% |
| Reset value | 166,661 | 16,032 |
| Average Award | 490,179 | 47,153 |

Modeling play behavior

| Credits / Card | Percent of Play | Progressive 1 Hits | Progressive 1 Contribution | Progressive 2 Hits | Progressive 2 Contribution |
|---|---|---|---|---|---|
| 1 | 10.00% | | 0.0005 | | 0.0040 |
| 2 | 10.00% | | 0.0010 | | 0.0080 |
| 3 | 10.00% | | 0.0015 | 10.00% | 0.0120 |
| 4 | 10.00% | | 0.0020 | 10.00% | 0.0160 |
| 5 | 10.00% | | 0.0025 | 10.00% | 0.0200 |
| 6 | 10.00% | | 0.0030 | 10.00% | 0.0240 |
| 7 | 10.00% | | 0.0035 | 10.00% | 0.0280 |
| 8 | 10.00% | | 0.0040 | 10.00% | 0.0320 |
| 9 | 10.00% | | 0.0045 | 10.00% | 0.0360 |
| 10 | 10.00% | 10.00% | 0.0050 | 10.00% | 0.0400 |
| Total | 100.00% | Ave. Contr. | 0.2750 | Ave. Contr. | 0.2750 |

820

*FIG. 8*

MULTI-CARD BINGO GAME FEATURES

BACKGROUND OF THE INVENTION

This application claims priority to U.S. Provisional Patent Application No. 61/066,137, entitled "MULTI-CARD BINGO GAME FEATURES", filed on Sep. 18, 2007, which is hereby incorporated by reference for all purposes.

BACKGROUND OF THE INVENTION

The present disclosure relates to gaming networks and, more particularly, to gaming networks for providing multi-player bingo games.

Gaming in the United States is divided into Class I, Class II and Class III games. Class I gaming includes social games played for minimal prizes, or traditional ceremonial games. Class II gaming includes bingo and bingo-like games. Bingo includes games played for prizes, including monetary prizes, with cards bearing numbers or other designations in which the holder of the cards covers such numbers or designations when objects, similarly numbered or designated, are drawn or electronically determined, and in which the game is won by the first person covering a previously designated arrangement of numbers or designations on such cards. Such an arrangement will sometimes be referred to herein as a "game-winning pattern" or a "game-ending pattern." Class II gaming may also include pull tab games if played in the same location as bingo games, lotto, punch boards, tip jars, instant bingo, and other games similar to bingo. Class III gaming includes any game that is not a Class I or Class II game, such as a game of chance of the kind typically offered in non-Indian, state-regulated casinos.

Two basic forms of bingo exist. In traditional bingo, the players purchase cards after which a draw takes place. The first player to achieve a designated pattern wins. In one type of bingo game known as Bonanza Bingo, the draw for the game takes place before the players know the arrangements on their bingo cards. After the draw occurs, the players may purchase cards and compare the arrangements on the cards to the drawn numbers to determine whether predetermined patterns are matched. Play continues in Bonanza Bingo until at least one of the players matches a designated game-winning pattern. Bonanza Bingo may also encompass bingo variations wherein a partial draw is conducted for some numbers (generally fewer than the number of balls expected to be necessary to win the game) prior to selling the bingo cards. After the bingo cards are sold, additional numbers are drawn until there is a winner.

In a typical bingo game, a "ball drop" display indicates randomly-drawn numbers to be used in playing the bingo game. Accordingly, the term "ball drop" or the like will be used herein to signify the random selection of numbers used in a bingo game; accordingly, the selected bingo numbers themselves will often be referred to as "balls." Those of skill in the art will realize that the numbers used in an electronic bingo game may be displayed in any convenient fashion and that a simulated "ball drop" is merely one such example. The number of balls drawn and the timing of the ball drops may vary according to the type of bingo game.

As indicated above, a bingo game is played until at least one player covers a predetermined game-winning pattern on the player's bingo card. The game may also include interim winners of prizes based on matching predetermined interim patterns on the bingo card using the same ball draw. The interim pattern wins do not terminate the bingo game. For interim pattern awards, players covering certain interim patterns may receive an additional award as the game continues. Some exceptional bingo versions may allow bingo draws beyond those needed to achieve the bingo game win so as to pay out interim pattern wins at a desired rate. The game-winning awards are generally pari-mutuel in nature. That is, the bingo win award is based upon the total amount wagered on a given occurrence of the bingo game. However, interim pattern awards typically are not pari-mutuel.

Gaming machines such as slot machines and video poker machines have proven to be very popular. However, many games of chance that are played on gaming machines fall into the category of Class III games, which may be subject to stricter approval and regulation. Many gaming establishments have a limited number of gaming machines for playing Class III games and a greater number of gaming machines for playing Class II games, such as bingo. Gaming establishments in some jurisdictions may not be allowed to have any gaming machines for playing Class III games, but may nonetheless allow gaming machines for playing Class II games, such as bingo games.

One way of making wagering games, including Class II games, more interesting is to provide players a chance to obtain a large payout, such as that made possible by a progressive bonus award. However, providing a large progressive award for a bingo game can be challenging, as described in more detail below.

Another way of making bingo games more interesting is to provide players with the chance of obtaining one or more extra selected bingo numbers after the normal ball drop of a bingo game. Yet another way of making bingo games more interesting is to increase the paytable percentage for the bingo game, at least temporarily.

Although prior art methods exist for providing players with a chance for obtaining extra bingo numbers and for modifying a paytable percentage for the bingo game, these prior art methods have some shortcomings. For example, one method for of modifying a paytable percentage that is commonly used outside of the United States is to modify the number of winning patterns and/or of awarding a different amount for a pattern. A casino may, e.g., lower the payback percentage of a bingo game by temporarily eliminating certain patterns (such as temporarily eliminating the "four corners" pattern). Such methods can easily be noticed by players and may lead to player dissatisfaction.

As such, it would be desirable to provide improved gaming methods, devices and systems for providing Class II games, including but not limited to bingo games, especially on networked gaming machines.

SUMMARY OF THE INVENTION

Novel methods, devices and systems are described for implementing Class II games, especially bingo games. According to some such implementations, after the main ball drop of a bingo game, a player may be given a free extra bingo number (sometimes referred to herein as a "free ball" or the like). Some implementations allow the probability of awarding a free ball to be changed, e.g., by a gaming establishment. Some such implementations allow a gaming establishment to select a desired paytable percentage for the bingo game. A probability of awarding a free ball may be determined, at least in part, according to a desired paytable percentage for the bingo game (or vice versa).

Some implementations of the invention provide multi-card bingo games. Progressive bonus awards may be presented in connection with such multi-card bingo games. In some such implementations, a player may be required to hit a predetermined pattern on more than one bingo card in order to obtain the progressive award. The number of hits in the pattern(s) and/or the number of bingo cards involved may be determined according to a desired progressive award size and/or a desired probability of obtaining the progressive award. Some such implementations provide a higher average progressive award than implementations which require a pattern on only one bingo card.

Alternative implementations of the invention allow players an opportunity to purchase one or more additional bingo numbers after the main ball drop of a bingo game. In some such implementations, a player may be provided the option of purchasing a block of more than one additional bingo number after the main ball drop. The player may be offered such a block at a discount, as compared to the price for purchasing the additional bingo numbers individually. Some such implementations may be combined with one or more of the "free ball" implementations and/or the progressive implementations described herein. Similarly, some progressive bonus implementations may be combined with one or more of the "free ball" implementations and/or with implementations that involve purchasing additional bingo numbers after the main ball drop of a bingo game.

Some embodiments of the invention provide an apparatus for controlling a bingo paytable percentage. The apparatus includes a network interface and a logic system comprising at least one logic device. The logic system may be configured to do the following: receive an indication of a desired bingo paytable percentage for a bingo game involving a selection of N bingo numbers; determine a probability of awarding a free $(N+1)^{th}$ bingo number to a player, the probability corresponding to the desired bingo paytable percentage; and provide an indication of the probability. The logic system may be configured to receive the indication of the desired bingo paytable percentage from the network interface, from the GUI, from another user interface, etc. The apparatus may be configured to provide the indication to another device via the network interface.

The apparatus may further comprise a display device. The logic system may be further configured to provide a graphical user interface ("GUI") configured to receive the indication of the desired bingo paytable percentage. The logic system may be further configured to control the display device to provide the indication of the probability.

The apparatus may comprise a server, a host device or another device that is further configured to provide, at least in part, the bingo game. For example, the apparatus may comprises a random number generator configured to determine when to award the free $(N+1)^{th}$ bingo number to a player according to the indicated probability. The bingo game may involve winning patterns of bingo numbers on bingo cards. Changing the bingo paytable percentage preferably does not involve changing a number of winning patterns or a payout for any winning pattern of the bingo game. The bingo game may be a multi-card bingo game. Each of the bingo cards provided to a player for a single instance of the bingo game may or may not indicate different bingo numbers from each of the other bingo cards provided to the player for the single instance of the bingo game.

Some implementations of the invention involve methods of controlling a bingo paytable percentage. Some methods include these steps: receiving an indication of a bingo paytable percentage for a bingo game involving a selection of N bingo numbers; and determining a probability of awarding a free $(N+1)^{th}$ bingo number to a player, the probability corresponding to the bingo paytable percentage. The method may involve providing an indication of the probability.

The method may also include these steps: providing the bingo game; and awarding the free $(N+1)^{th}$ bingo numbers to players according to the probability. A change to the bingo paytable percentage preferably does not produce a change to winning patterns of the bingo game or produce a change a payout for any winning pattern of the bingo game. The offering step may involve offering players the entire plurality of additional bingo number in exchange for the indicium of value. The method may involve offering players at least one additional bingo number in exchange for an indicium of value. The method may involve offering players a block of additional bingo numbers in exchange for an indicium of value.

The method may include the step of receiving an indication of the value of N. The determining step may involve determining the probability based, at least in part, on the value of N. The method may involve receiving an indication of how many bingo numbers are used in the bingo game. The determining step may involve determining the probability based, at least in part, on how many bingo numbers are used in the bingo game. The method may include the step of receiving an indication of how many bingo cards are used in the bingo game. The determining step may comprise determining the probability based, at least in part, on how many bingo cards are used in the bingo game. The method may involve receiving an indication of how many spots are on the bingo cards used in the bingo game. The determining step may comprise determining the probability based, at least in part, on how many spots are on the bingo cards.

Some embodiments of the invention provide a gaming system that includes these elements: apparatus for receiving an indication of a bingo paytable percentage for a bingo game involving a selection of N bingo numbers; and apparatus for determining a probability of awarding a free $(N+1)^{th}$ bingo number to a player, the probability corresponding to the bingo paytable percentage.

The gaming system may also comprise apparatus for providing an indication of the probability. The gaming system may further comprise apparatus for providing the bingo game and apparatus for awarding the free $(N+1)^{th}$ bingo numbers to players according to the probability. The gaming system may include apparatus for offering players at least one additional bingo number in exchange for an indicium of value. The gaming system may include apparatus for offering players a plurality of additional bingo numbers in exchange for an indicium of value. The offering apparatus may comprise apparatus for offering players the entire plurality of additional bingo numbers in exchange for the indicium of value.

Methods of controlling a progressive bonus for a bingo game are provided herein. Some such methods include these steps: receiving an indication of a desired probability of winning a progressive award in a bingo game involving multiple bingo cards; determining a number M of hits on R of the bingo cards that will provide an actual probability of winning the progressive award that approximates the desired probability, where $R>1$; and indicating M and R.

The method may involve indicating at least one pattern of hits for each of the R bingo cards. The indicating step may involve indicating at least one pattern on a display device. The pattern may be the same for each of the R bingo cards. Each of the bingo cards may indicate N bingo numbers. In some instances, $M>N$.

The method may include these steps: calculating an average size of the progressive award based, at least in part, on the actual probability of winning the progressive award; and indicating the average size of the progressive award. The calculating step may also be based on a percentage of wagers to be contributed to a progressive award pool. The calculating step may also be based on a required wager per bingo card. The required wager per bingo card may be received from, e.g., at least one of a network interface, a graphical user interface, a user input device or a memory. The indicating step may involve indicating at least one of M or R on a display device.

Alternative methods for controlling a progressive bonus for a bingo game are provided herein. Some such methods include these steps: receiving an indication of a desired probability of winning a progressive award in a bingo game involving multiple bingo cards, wherein each of the bingo cards indicates N bingo numbers; determining a number M of hits on bingo numbers of the bingo cards that will provide an actual probability of winning the progressive award that approximates the desired probability, where M>N; and indicating M.

In some instances, the M hits must be on R of the bingo cards. If so, the method may involve indicating R. The method may involve indicating at least one pattern of hits for each of the R bingo cards. The pattern may or may not be the same for each of the R bingo cards. The indicating step may comprise indicating at least one pattern on a display device. The indicating step may comprise indicating M on a display device.

The method may further comprise these steps: calculating an average size of the progressive award based, at least in part, on the actual probability of winning the progressive award; and indicating the average size of the progressive award.

Some embodiments of the invention provide an apparatus for controlling a progressive bonus for a bingo game. The apparatus may include a network interface and a logic system comprising at least one logic device. The logic system may be configured to do the following: receive an indication of a desired probability of winning a progressive award in a bingo game involving multiple bingo cards, each of the bingo cards having N bingo numbers; determining a number M of hits on R of the bingo cards that will provide a probability of winning the progressive award that approximates the desired probability, where R>1; and indicating M and R.

The logic system may be further configured to indicate a pattern of hits for each of the R bingo cards. The pattern may or may not be the same for each of the R bingo cards.

The apparatus may also include a display device. The logic system may be further configured to indicate M and R on the display device. The logic system is further may be configured to indicate a pattern of hits for each of the R bingo cards on the display device. The logic system may be further configured to provide a graphical user interface ("GUI") on the display device, the GUI configured for receiving parameters such as the indication of the desired probability of winning the progressive award, a desired progressive award size, etc. The GUI may be further configured for receiving a value of N, a maximum number of bingo cards that may be played in the bingo game and/or other parameters.

Some implementations of the invention provide methods for controlling purchases of extra bingo numbers for a bingo game. Some such methods include these steps: providing a bingo game involving a selection of N bingo numbers; indicating hits on bingo cards corresponding to selected bingo numbers; and offering at least some bingo players an option of purchasing a predetermined quantity of $(N+1)^{th}$ through $(N+A)^{th}$ bingo numbers for a first indicium of credit, where A is an integer greater than 1.

The method may involve determining whether a player has been awarded a free $(N+1)^{th}$ bingo number prior to the offering step. When it is determined that a player has been awarded a free $(N+1)^{th}$ bingo number prior to the offering step, the method may further comprise offering the player an option of purchasing a predetermined quantity of $(N+2)^{th}$ through $(N+B)^{th}$ bingo numbers for a first indicium of credit, where B is an integer greater than 2. Alternatively, or additionally, the method may comprise offering at least some bingo players an option of purchasing a single $(N+1)^{th}$, $(N+2)^{th}$ or other extra bingo number for another indicium of credit.

The present invention provides hardware (such as gaming machines, network devices, host devices and components of such devices) that is configured to perform the methods of the invention, as well as software to control devices to perform these and other methods.

These and other features of the present invention will be presented in more detail in the following detailed description of the invention and the associated figures.

BRIEF DESCRIPTION OF THE DRAWINGS

FIG. 4C depicts a data structure that may be used to implement some aspects of the invention.

FIG. 5 depicts data structures that may be used to implement additional aspects of the invention.

FIG. 6 depicts a data structure that may be used to implement some aspects of the invention.

FIG. 8 depicts data structures that may be used to implement some aspects of the invention.

DETAILED DESCRIPTION OF THE INVENTION

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

Although much of the discussion herein pertains to bingo games, at least some aspects of the invention are not limited to bingo games. Instead, the invention at least some aspects of the invention apply generally to various types of wagering games, particularly central determination games. Moreover, while much of the discussion herein pertains to multi-card bingo games, some aspects of the invention apply to single-card bingo games.

Figure 1:
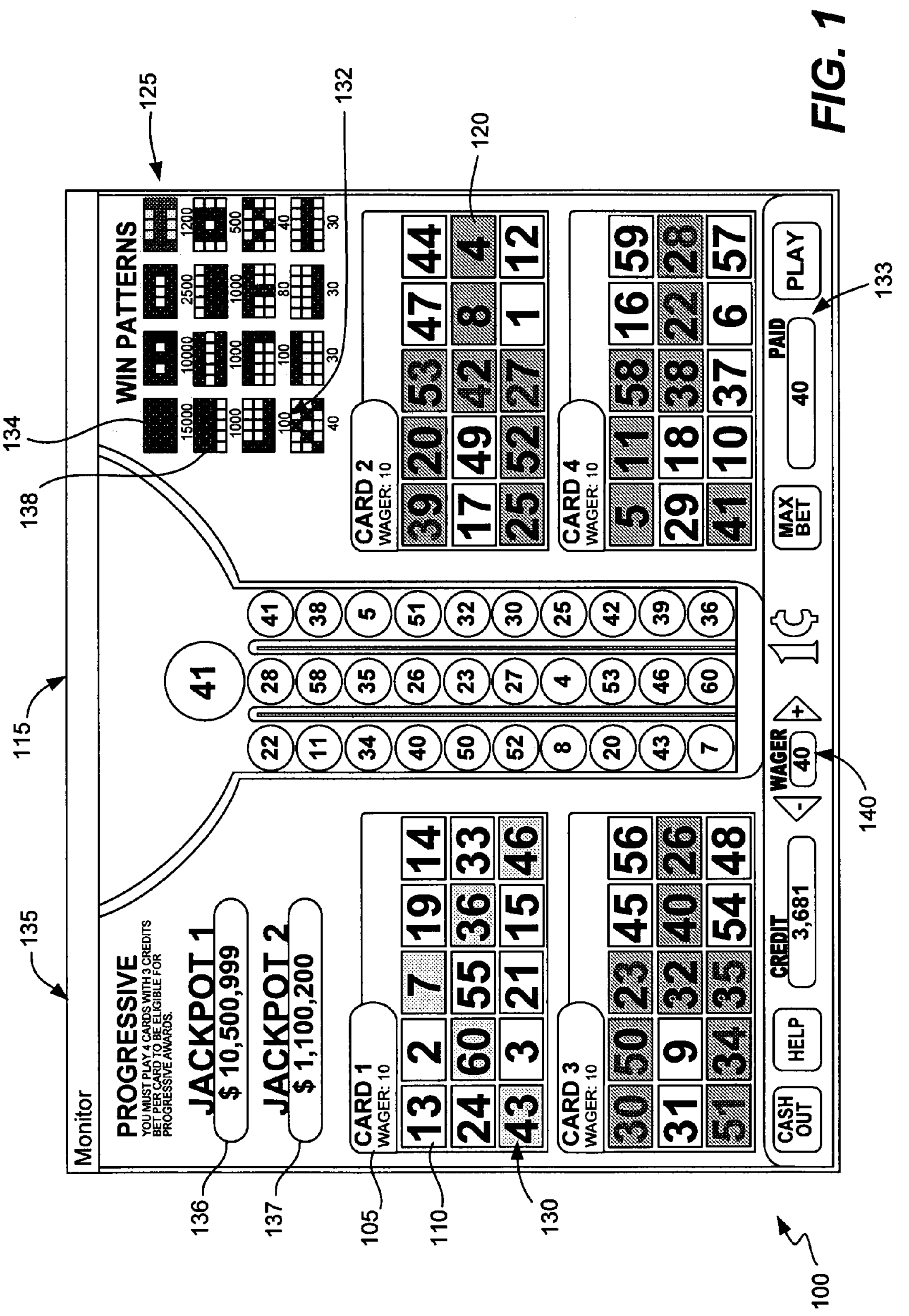
FIG. 1 illustrates one example of a display for a multi-card bingo game.

Multi-card bingo games have become popular. Existing games often have a similar layout, providing multiple bingo cards and indicating winning patterns. One example display for a multi-card bingo game is shown in FIG. 1. Such a display may be presented, for example, on a display device of a wager gaming machine. The wager gaming machine may be configured for communication with a game server, a progressive server and/or other devices, as described in more detail herein. Those of skill in the art will realize that the bingo display shown in FIG. 1 is merely an example and that other layouts, numbers of bingo cards, the bingo numbers (also known as "spots") on each bingo card, the types of win patterns, numbers of win patterns, progressive award requirements, etc., than illustrated in FIG. 1 are contemplated by the present inventors.

In this example, display 100 includes 4 bingo cards 105. Each of bingo cards 105 has 3 rows and 5 columns of bingo numbers 110, making a total of 15 bingo numbers 110 per card. This makes a total of 60 bingo numbers 110 in total, for all four bingo cards.

Bingo numbers may or may not be duplicated across the multiple bingo cards provided to a player for a particular bingo game, according to the implementation. In this example, the bingo numbers on each card are unique. For example, only Card 1 includes a bingo number 13. of the four 15-spot bingo cards 105 has different bingo numbers, ranging from 1 to 60.

In bingo games, the draws or "ball drops" of bingo numbers normally involve a predetermined number N of balls, at least for the initial or main ball drop. In this example, N=30 out of a total of 60 possible bingo numbers. The selected bingo numbers are displayed in area 115. During the ball drop, the player may be presented with video images of balls with bingo numbers dropping into area 115 from above.

After the initial ball drop, "hits" 120 are displayed on the bingo cards 105. The darkened bingo numbers of bingo cards 105 indicate the hits 120. A hit 120 occurs when a selected bingo number (from the ball drop) matches a bingo number on one of the player's bingo cards 105. For example, the indicated hit 120 on bingo number 4 corresponds with ball 4 displayed in ball drop area 115.

The hits may or may not produce a "win pattern" that entitles a player to an award. The possible non-progressive win patterns for this bingo game are displayed in area 125. In this example, the hits 120 on Card 1 have produced a winning inverted "V" pattern 132, entitling the player to 40 credits. The number of credits paid for this game are indicated in "paid" window 133.

In some bingo games, a player will only receive credit for the highest-level pattern of hits on a bingo card. However, in this example, a player will receive credit for all patterns that are not subsumed by another pattern. For example, if all spots in a card are hit, the player will receive 15000 credits for "blackout" pattern 134, but no other patterns will be paid for that card. The player does not obtain additional awards for completing a "V" pattern, a line pattern, etc. The paytables shown and described herein are based on the assumption that a player will receive credit for all patterns that are not subsumed by another pattern.

Area 135 indicates some conditions for winning a progressive award or "jackpot." In this example, there are two progressive jackpots. The current amounts of Jackpot 1 and Jackpot 2 are indicated by jackpot meters 136 and 137, respectively. The jackpots are funded by a percentage of each player's wager, as described in more detail below.

In this example, a player must play all four bingo cards and must bet at least 3 credits per card in order to be eligible for a progressive award. In this example, if the player plays all four bingo cards, bets at least 3 credits per card and obtains a "double line" pattern 138 on any 2 bingo cards, the player will win Jackpot 2. In this example, a player may indicate a desired wager level by interacting with the "credits bet" area 140 of display 100. If the player plays all four bingo cards, bets at least 3 credits per card and obtains a predetermined 11-spot pattern (not shown) on any 2 bingo cards, the player will win Jackpot 1.

Even if the player attains double line pattern 138 on 2 bingo cards but does not wager at least 3 credits per card, the player will not win the Jackpot 2. Instead, the player would only receive 1000 credits for each pattern. However, in this implementation, a percentage of the player's wager would still be added to the progressive pools for Jackpot 1 and Jackpot 2.

Some bingo games provide a player the opportunity to purchase one or more additional bingo numbers after the initial ball drop of N balls. In this example, after the initial ball drop of 30 balls, a player may purchase up to 9 additional bingo numbers (sometimes referred to herein as "extra balls" or the like), making a total of up to 39 balls. Other implementations may involve more or fewer balls in the initial ball drop. Similarly, other implementations may provide the option of purchasing more or fewer extra balls, or even no extra balls.

Bulk Purchases of Extra Balls

Some implementations of the invention provide a player with the option of purchasing extra bingo balls either one at a time or in "bulk." Rather than buy one extra ball at a time, the player may choose to buy a group of 2 or more extra balls. In some such implementations, the player may be able to purchase the group of extra balls for a lower price than if the player had purchased each extra ball separately. This provides a potential benefit to both the player and the casino. The player may be able to purchase the extra balls at a discounted price. The casino benefits by selling all of the extra balls, rather than having the player buy them one at a time and possibly quitting earlier.

Some implementations of the invention provide players with opportunities to obtain one or more "free" extra balls (without requiring the player to provide an indicium of credit for the extra ball or balls). According to the implementation, the extra balls may be obtained for free, by purchasing them, or by some combination of the two. In some implementations, there may be one or more requirements (e.g., of wagering, credits input, etc.) for a player to become eligible to purchase any extra balls. According to some such implementations, a player will not be eligible to obtain a free ball if the player is not eligible to purchase additional extra balls. In other implementations, an aspect of game play may determine whether a player qualifies for an extra ball. For example, in some such implementations, the player must be only one spot away from hitting a pattern of a particular value (e.g., a pattern that pays at least a predetermined number of credits). In yet other implementations, there are no such requirements for obtaining a free extra ball.

Figure 2:
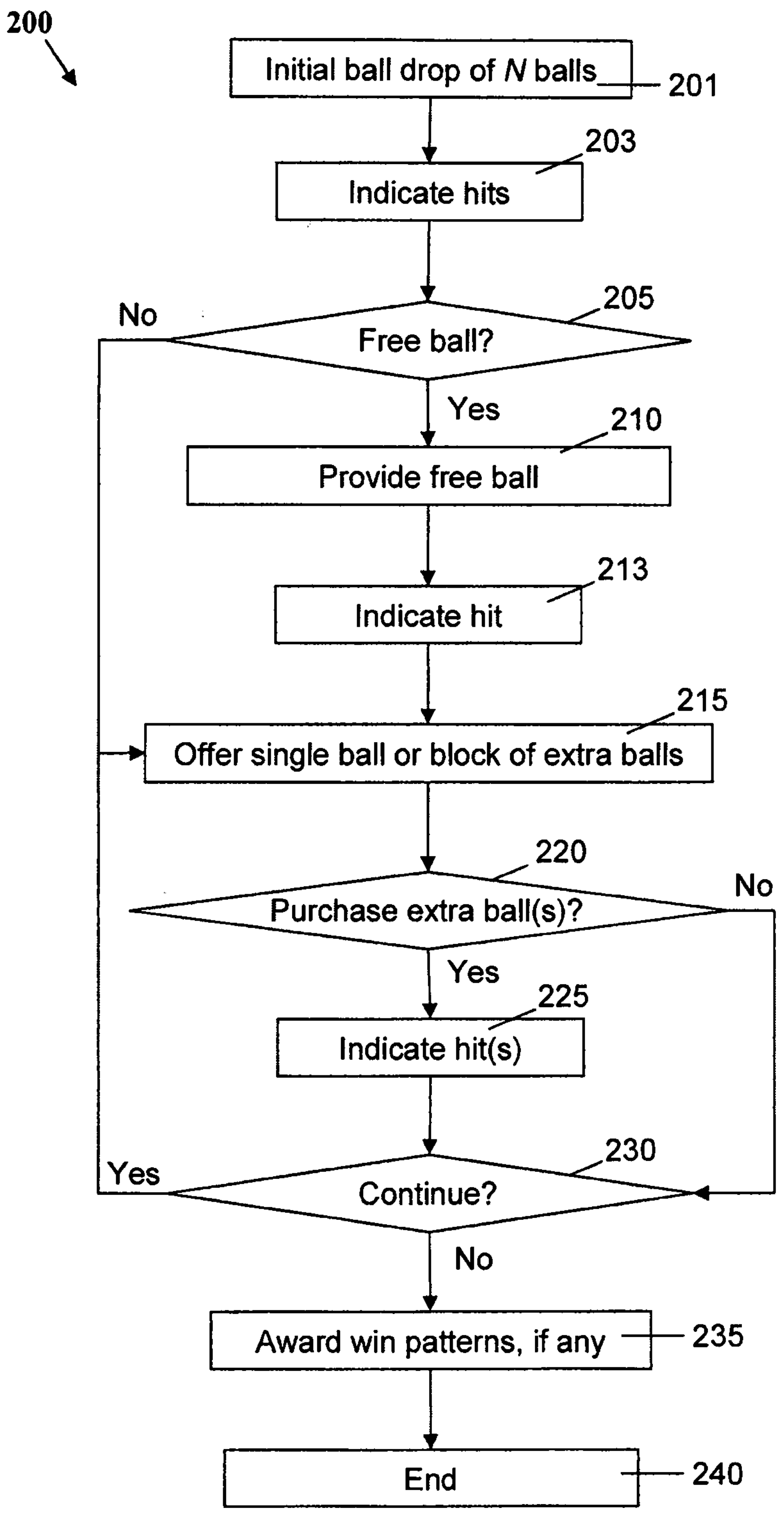
FIG. 2 is a flow chart that illustrates some examples of providing free and/or purchased extra balls after an initial ball drop of a bingo game.

Some examples of providing free and/or purchased extra balls are illustrated by flow chart 200 of FIG. 2. After a player has provided indicia of credit and wagered, there is an initial ball drop of N balls for a bingo game. (Step 201.) In the example shown in FIG. 1, N=30, but N may be any convenient number. N may be selected by a casino, at least in part, according to the number of bingo cards that could be played at one time, the number of spots on each card, etc. After the initial selection of N bingo numbers, the resulting hits are displayed on a player's bingo card(s). (Step 203.)

In this example, a player has a chance to obtain a single "free" extra ball. The extra ball may be considered an $(N+1)^{th}$ selected bingo number.

Accordingly, it is determined in step 205 whether a player will obtain an extra ball without charge. This determination may be made, at least in part, according to a predetermined probability P, which may be configurable by a gaming establishment. The determination may also be made according to other criteria, such as a player's wagering level, credit level, etc.

For example, a casino may modify probability P according to the time of day, machine occupancy, and/or according to a player's rank in a player loyalty program. In some implementations (described in more detail below), a gaming establishment may adjust probability P to produce a desired paytable percentage.

Step 205 may be performed, for example, by a server, a host device or another device involved with providing the bingo game. Step 205 may involve using a random number generator ("RNG") to make a selection from a range of numbers. For example, if the probability P were 0.05, an RNG might make a random selection from among 10,000 numbers. Step 205 may involve determining whether one of 500 numbers corresponding to a free extra ball is selected out of the 10,000 numbers.

If the player is awarded a free extra ball, it is provided in step 210. When a free extra ball is given to a player, the extra ball is preferably awarded with some fanfare. For example, the player may see and/or hear, "YOU GOT A FREE BALL!!!" There may be a characteristic sound, characteristic lighting, etc., associated with obtaining a free extra ball. Preferably, nearby players can also see whether a player has obtained a free ball.

In this example, the player has selected to play all available bingo cards in a multi-card game. Moreover, in this game, each ball drawn will provide a hit on one of the bingo cards. The hit resulting from the free extra ball, if any, is indicated on the player's bingo card. (Step 213.)

In this implementation, whether or not the player obtains a free extra ball, the player is provided a chance to purchase one or more additional extra balls. (Step 215.) For example, the player may be offered the first extra ball for 5 credits. Suppose the player accepts the offer and pays 5 credits. (Step 220.) The hit is indicated on the player's card. (Step 225.) However, in this example, the player still does not get a desired "hit" to complete a pattern.

If the player decides to continue (step 230), the player may be offered another ball. (Step 215.) The price of each additional ball preferably increases, because the chances of obtaining a desired (or desirable) result increase with each ball. This is so because there are fewer and fewer remaining bingo numbers to draw from. Here, for example, the player may be offered another ball for 6 credits.

Suppose the player accepts the offer and pays 6 credits. (Step 220.) The hit is indicated on the player's card. (Step 225.) Unfortunately, the player still does not get a desired "hit" to complete a pattern. If the player decides to continue (step 230), the player will be offered another bingo number for 8 credits. Suppose the player accepts the offer and pays 8 credits. (Step 220.) The hit is indicated on the player's card. (Step 225.)

In step 215, the player may be presented with the chance to purchase more than one extra ball at a time. For example, if a player has not been awarded a free extra ball, the player may be offered an option of purchasing a predetermined quantity of $(N+1)^{th}$ through $(N+A)^{th}$ bingo numbers, where A is an integer greater than 1. If a player has been awarded a single free extra ball, the player may be offered an option of purchasing a predetermined quantity of $(N+2)^{th}$ through $(N+B)^{th}$ bingo numbers for a first indicium of credit, where B is an integer greater than 2.

The player could be offered a group of balls for a slight discount. For example, instead of buying each of the balls separately (as described above) for a total of 19 credits, the player might be offered a chance to buy the first 3 extra balls for 18 credits.

If the player does not wish to purchase additional balls, the player will be awarded the credits corresponding to the win patterns (if any) achieved on the player's bingo card(s). (Step 235.) The process ends in step 240.

Figure 3:
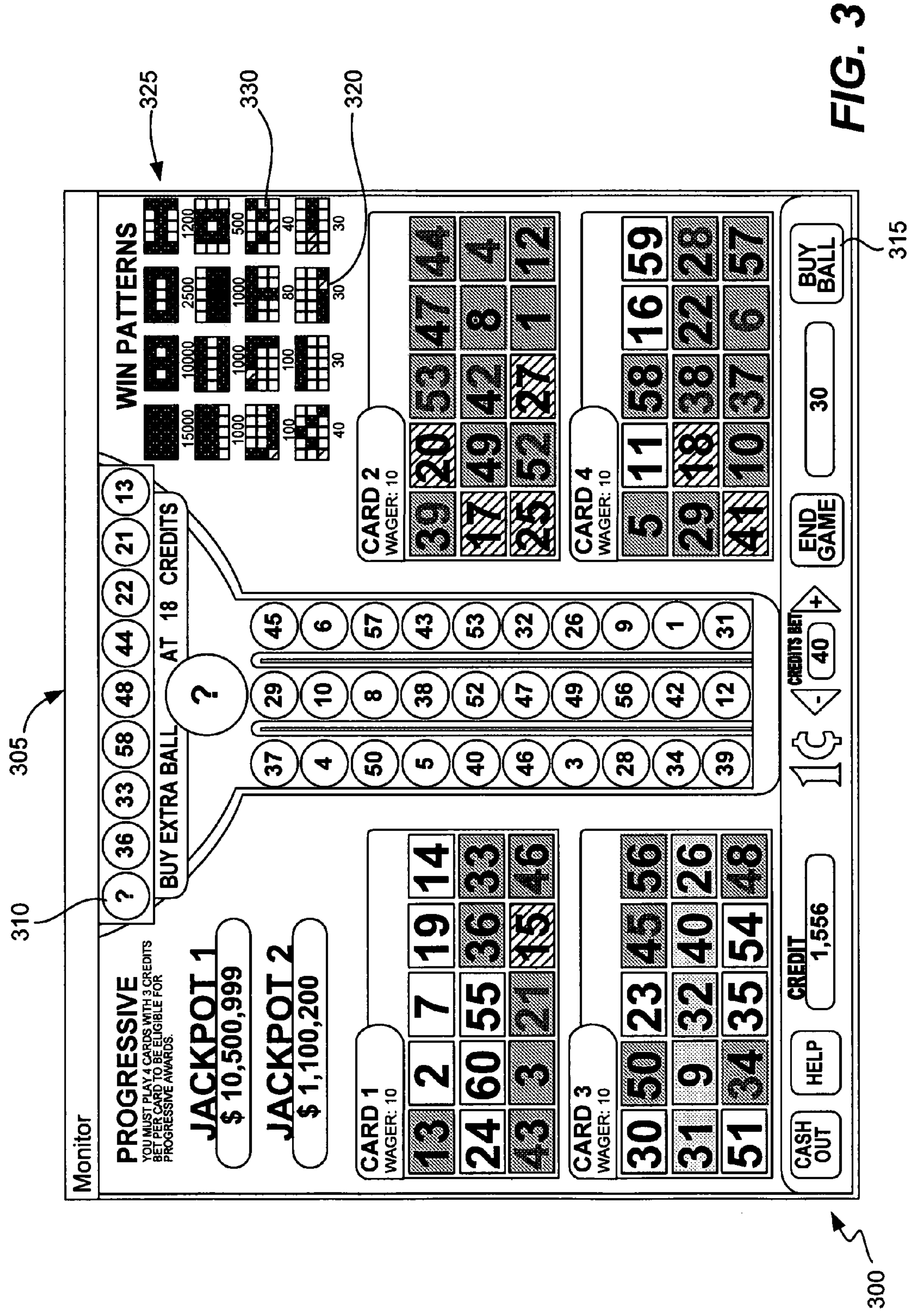
FIG. 3 illustrates another example of a display for a multi-card bingo game.

There is preferably a limit on the number of additional balls that a player may obtain. The limit may be selected, for example, to keep the extra ball price from becoming unreasonably high. In one such example, illustrated in FIG. 3, the player may obtain up to 9 balls. Area 305 of FIG. 3 indicates 9 extra balls that a player may obtain. Here, the player has already obtained 8 extra balls. Only ball 310, the $39^{th}$ ball, remains. As indicated below the extra balls, the player has the option of purchasing the $39^{th}$ ball for 18 credits. If the player wishes to make this purchase, the player can press "Buy Ball" button 315.

Display 300 includes other features of interest. On this display, bingo numbers that are "hit," such as bingo number 13 of Card 1, are displayed with a dark background. Most bingo numbers that have not been hit, such as bingo number 2 of Card 1, are displayed with a light background.

However, this display draws attention to un-hit bingo numbers which, if hit, would complete a pattern. The patterns in "Win Patterns" area 325 are also highlighted to indicate missing spots in nearly-completed patterns. Highlighting such features provides additional player excitement and encourages players to purchase extra balls in an attempt to complete the patterns.

One example is bingo number 15 of Card 1. If bingo number 15 were hit, a line pattern would be completed on the bottom row of Card 1. Bingo number 15 appears as an intermediate grayscale in FIG. 3, but in practice bingo number 15 might be bright green, bright yellow, etc. Corresponding pattern 320 also indicates the almost-completed line pattern indicated by the bottom row of Card 1, with actual hits displayed with an X and the un-hit bingo number in a bright color, which appears gray in FIG. 3. In some implementations, the color of the un-hit bingo number in the pattern is the same color used for the un-hit bingo number in the bingo card (here, number 15) which, if hit, would complete the pattern. Another example is provided by bingo number 27 of Card 2 and the corresponding pattern 330.

Controlling Payback Percentage According to the Probability of Obtaining One or More Free Extra Balls Gaming establishments often find it advantageous to change the payback percentage for wagering games, including bingo games. For example, a gaming establishment may choose to lower the payback percentage during peak wagering times and to raise the payback percentage during off-peak wagering times.

One method for changing the payback percentage of bingo games that is sometimes used outside of the United States is to modify the number of winning patterns and/or of awarding a different amount for a pattern. For example, a casino may lower the payback percentage of a bingo game by temporarily eliminating certain patterns (e.g., the "four corners" pattern). If the number of displayed win patterns changes, this can easily be noticed by players and may lead to player dissatisfaction.

Some implementations of the invention provide methods of altering a payback percentage of a bingo game without changing the number of win patterns or the amount of a win for each pattern. According to some such methods, a payback percentage of a bingo game may be modulated by changing a probability of awarding a free extra ball. The correlation between the payback percentage and the probability of awarding the free extra ball may depend on various factors, including but not limited to the number of balls N in the main ball drop and whether all players are eligible to receive a free extra ball.

Some implementations involve requirements for receiving a free extra ball. For example, there may be a wagering requirement, a "coin in" or similar credit requirement, a game-related requirement, etc. In some such implementations, a player will only be eligible to win a free extra ball if the player has nearly completed (e.g., is one spot away from completing) a win pattern of at least a threshold value (e.g., corresponding to an award of a threshold number of credits). In some implementations, for example, a player will only be eligible to receive a free extra ball if the player is also eligible to purchase additional extra balls. In such implementations, the free extra ball—and the possibility of winning the free extra ball—will not only add excitement, but could provide an inducement for a player to purchase additional extra balls.

Figure 4A:
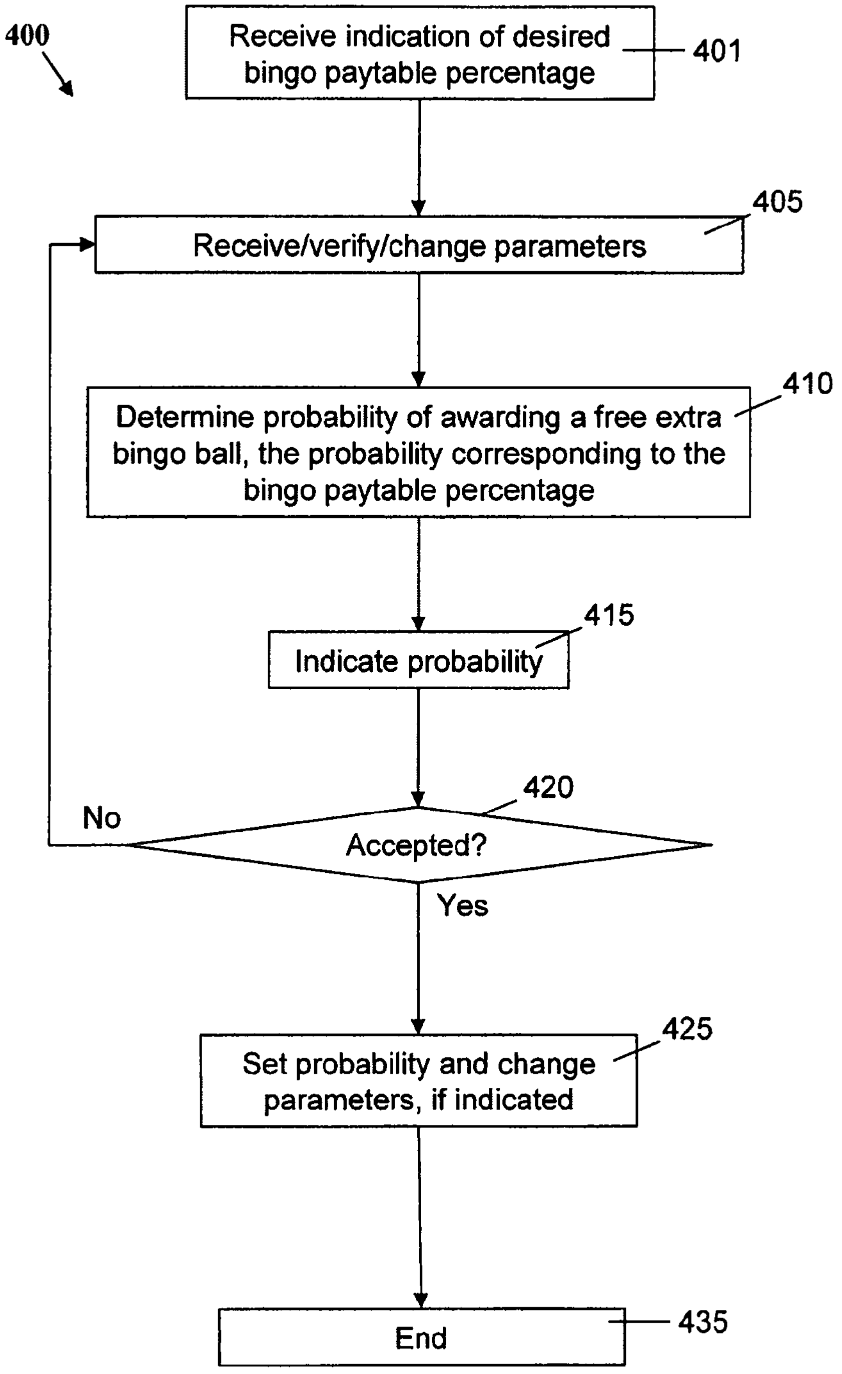
FIG. 4A is a flow chart that outlines some methods of the invention.

FIG. 4A provides an outline of steps of one such method 400. In step 401, an indication is received of a desired paytable percentage for a bingo game. This indication may be received via a user interface, such as a graphical user interface ("GUI"), another such user interface (e.g., a keyboard, a mouse, etc.), via a network interface, or by any other convenient means. As will be discussed in more detail below, the paytable percentage and its relationship with the probability of awarding a free extra ball may depend on various parameters, including but not limited to the win patterns involved, the hit frequency and award of each win pattern, the number of bingo balls selected in the main "ball drop," etc. These parameters (some of which are described in more detail below) may be received, verified and/or changed in step 405.

In step 410, a probability of awarding a free extra bingo ball is determined, based on the desired bingo paytable percentage in the context of the other relevant parameters. The probability is indicated in step 415, e.g., on a display screen or in any other convenient manner. In some alternative implementations, a user may input a probability of awarding a free extra bingo ball and the paytable percentage will be determined and indicated accordingly.

Some implementations of the invention may involve calculating a free ball probability F according to the formula $F=(D-B)/(C-B)$. In this example, B is the paytable percentage for the main ball drop, involving N balls. C is the paytable percentage corresponding to a free ball scenario, involving (N+1) balls in total. D corresponds to a desired paytable percentage.

If the indicated probability is accepted (as determined in step 420), the probability will be set accordingly. (Step 425.) Other related parameters may be changed, if indicated. The results may be used to control a bingo game. For example, the results may be provided to a server, a host device, or to another device involved with providing the bingo game. In some implementations, a device involved with providing the bingo game may also perform, at least in part, the steps of method 400.

Figure 4B:
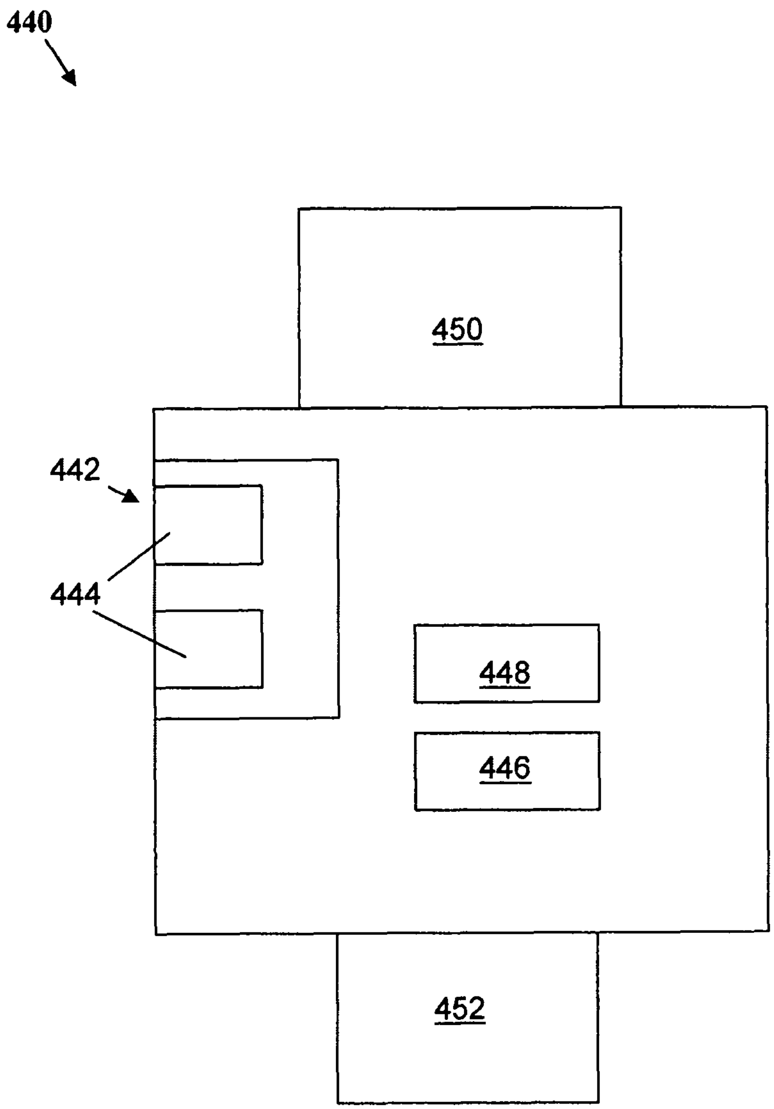
FIG. 4B illustrates components of a device that may be used to implement some aspects of the invention.

The steps of method 400 (and/or similar methods) may be performed, for example, by an apparatus such as apparatus 440 of FIG. 4B. Apparatus 440 may be, for example, a host device, a server, or another device that is configured for controlling a bingo paytable percentage. Such an apparatus may include, for example, interface system 442 and logic system 448. The interface system preferably includes at least one network interface 444, which may be configured for communication with a gaming network and/or other networks. A more detailed description of gaming networks and related devices is provided below.

The logic system 448 includes at least one logic device, such as a processor, a programmable logic device, etc. The logic system may be configured to do the following: receive an indication of a desired bingo paytable percentage for a bingo game involving a selection of N bingo numbers; determine a probability of awarding a free $(N+1)^{th}$ bingo number to a player, the probability corresponding to the desired bingo paytable percentage; and provide an indication of the probability. Pertinent information, such as data structures described herein (e.g., with reference to FIGS. 4C and 5) may be stored in memory 446.

In this example, apparatus 440 includes display device 450. Logic system 448 may be configured to control display device 450 to provide information such as the indication of the probability described in step 415 of FIG. 4A. Logic system 448 may also be configured to provide a graphical user interface ("GUI") on display device 450 configured to receive the indication of the desired bingo paytable percentage and/or other related parameters. Alternatively, or additionally, a user may interact with user input system 452 to provide such information. User input system 452 includes at least a keyboard in this example, but may be also include any convenient type of input device known in the art, e.g., a mouse, a keypad, etc.

The logic system may also receive such information from network interface system 442. Similarly, apparatus 440 may be configured to provide indications (e.g., according to step 415 of FIG. 4A) to another device via interface system 442.

Apparatus 440 may be configured to provide, at least in part, a bingo game. The bingo game may be a single-card or a multi-card bingo game. For example, apparatus 440 may comprise a random number generator (e.g., as part of logic system 448) configured to determine when to award the free $(N+1)^{th}$ bingo number to a player according to the indicated probability, after a "ball drop" wherein N bingo numbers are selected. Preferably, a change in the bingo paytable percentage does not affect winning patterns of the bingo game or a payout for any winning pattern of the bingo game.

Alternatively, or additionally, apparatus 440 may be configured to control offers to players for extra bingo balls in exchange for indicia of value. For example, apparatus 440 may send configuration information to wager gaming machines via interface system 442 indicating, e.g., the number of extra bingo balls that may be offered, the price per extra bingo ball and/or for blocks of extra bingo balls, etc.

FIG. 4C indicates a representative data structure 460 that may be involved in a conversion from the odds of receiving an extra bingo ball to bingo paytable percentage, or vice versa. Field 465 indicates the odds of receiving an extra bingo ball and field 470 indicates the corresponding overall paytable percentage.

Some parameters of the underlying game are as follows. The bingo game is a multi-card bingo game wherein up to four, 3 by 5 bingo cards may be played per game. All 60 bingo numbers in the four bingo cards are unique; in other words, a bingo number will only appear on one of the bingo cards. Thirty balls are drawn in the initial ball drop (N=30). With the particular patterns, pays and hit frequencies chosen (see FIG. 5), the payback percentage may be modulated from approximately 85% to approximately 95% by changing probability of providing a "free" $31^{st}$ ball to a player from 114 out of 1000 to 775 out of 1000.

In preferred implementations, regardless of the payback percentage, the same win patterns are used and the payout remains the same for each pattern. Accordingly, the bingo game presents itself in the same way to a player, regardless of the payback percentage. The only difference is how frequently the player receives the "free" extra ball.

FIG. 5 provides additional information for the 90% probability instance of data structure 460. In some implementations of the invention, a display (e.g., display device 450 of FIG. 4B) may indicate one or more areas of FIG. 5. For example, a user may alter one or more fields indicated (e.g., by interacting with a GUI on display device 450 and/or by interacting with user input system 452) and related fields will automatically adjust (e.g., according to instructions from logic system 448).

Area 500 indicates base game parameters. In this example, area 500 indicates how many bingo numbers or "balls" are involved (60 in this example), how many bingo numbers are initially selected (N=30 in this example), how many bingo cards may be played, wager limits, etc.

Area 505 includes parameters relating to an extra ball. The odds of a player obtaining a free extra ball in any one game are 444 out of 1000 in this example. A maximum of 8 extra balls may be awarded, including the free extra ball (if any). In this example, a player must be one spot away from attaining a win pattern that is worth 30 credits or more to obtain a free extra ball.

Area 510 indicates bet levels and payback percentages. In this case, there are two progressive awards for the bingo game. In order to qualify for the base game, a player must bet one credit per card. However, in order to qualify for progressive 2, the player would need to bet at least 3 credits per card. Eligibility for progressive 1 requires the "max bet," which is a wager of 10 credits per card. Here, the total payback percentage from all non-progressive patterns (the "base payback percentage") is approximately 90%. However, the overall payback percentage is over 92% if one takes into consideration the base game and progressive 2.

Details regarding the win patterns are provided in area 515, including the pattern number, a depiction of the pattern, the pattern name, the odds of hitting the pattern and the corresponding hit frequency. The non-progressive patterns of the base game only need to be attained on a single card, in addition to having lower wager requirements. However, the 9-spot "H" pattern for progressive 1 and the 8-spot "O" pattern of progressive 2 must be hit on two different bingo cards. This novel feature will be discussed in more detail in the next section of the disclosure.

Area 520 indicates the paytable details for each of the patterns indicated in area 515 and at each of the required bet levels indicated in area 510. In this example, the win amount remains the same for the patterns in the base game, regardless of wager level. In alternative implementations, the win amounts for patterns in the base game vary according to wager level.

Controlling a Progressive Probability and/or Size According to Win Patterns that Span Multiple Bingo Cards One novel feature provided herein involves win patterns for progressive awards that must be obtained on more than one bingo card. Such features are desirable for various reasons. Ideally, a casino would like the amount of a progressive jackpot to be large. For the same target size of jackpot, the lower the odds of hitting the progressive pattern, the higher percentage must come from each game. The 25-spot bingo cards commonly used in the United States can provide single-card progressive patterns that have low enough odds for providing a large progressive award, even if multiple bingo cards are played.

However, smaller bingo cards present challenges. With the 15-spot card, 4-card bingo game that is common in Mexico, for example, the highest odds for a single-card progressive pattern is 1/85,000, which is the probability of hitting all 15 numbers on a card, with 4 cards and 30 out of 60 balls drawn. Therefore, this progressive is hit more frequently than is desirable. In one example, 12% of the base wager for each game was being used to fund the progressive jackpot. This is too high to also provide a reasonable overall payback percentage.

One way to reduce the chance of a hitting the progressive pattern is to use a bingo card with more spots, e.g., the 25-spot cards that are common in the United States. However, some players prefer to play bingo games using bingo cards with fewer spots on a bingo card. For example, players in Mexico have shown a preference for using bingo cards with 15 spots.

Therefore, some implementations of the invention provide a larger progressive jackpot (lower probability) by implementing progressive win patterns that span multiple bingo cards. Some such implementations require a player to hit the same pattern on each card, e.g., a "Four Corners pattern on all four bingo cards. Although the player only needs to hit 16 spots instead of 15 spots for a single-card "blackout," the odds of the former are much lower (1 chance in 1,028,783). The player has 4 ways to hit the 15-spot "blackout," because this could occur on any one of the 4 bingo cards. In contrast, the player would only have 1 way to hit the 16-spot Four Corners pattern on all four bingo cards.

Not only do such implementations allow a lower contribution percentage for a desired progressive jackpot size, such multi-card progressive win patterns may have additional benefits. For example, multi-card progressive win patterns may have the appearance of being easer to hit than they really are. This may increase player excitement and/or player participation.

FIG. 6 indicates one example of a data structure 600 that may be used for some implementations of the invention. In this example, the values of data structure 600 are based upon the same type of 4-card, 15-spot bingo game described above, but alternative data structures may be used for other bingo game parameters.

In some implementations of the invention, a display (e.g., display device 450 of FIG. 4B) may indicate data structure 600 or a similar data structure. For example, a user may alter the value of bet size field 605 and/or contribution percentage field 610 (e.g., by interacting with a GUI on display device 450 and/or by interacting with user input system 452) and progressive size field 620 will automatically adjust (e.g., according to instructions from logic system 448).

Field 615 indicates the number of hits required for each pattern. Field 620 indicates the number of cards on which the pattern must be hit. For each combination of pattern size and number of cards on which the pattern must be hit, the odds are provided in field 625. In this example, the same size of pattern (number of hits) must be attained on each card. However, in other implementations, a different size pattern, different pattern shape, etc., may be hit on different cards.

Figure 7:
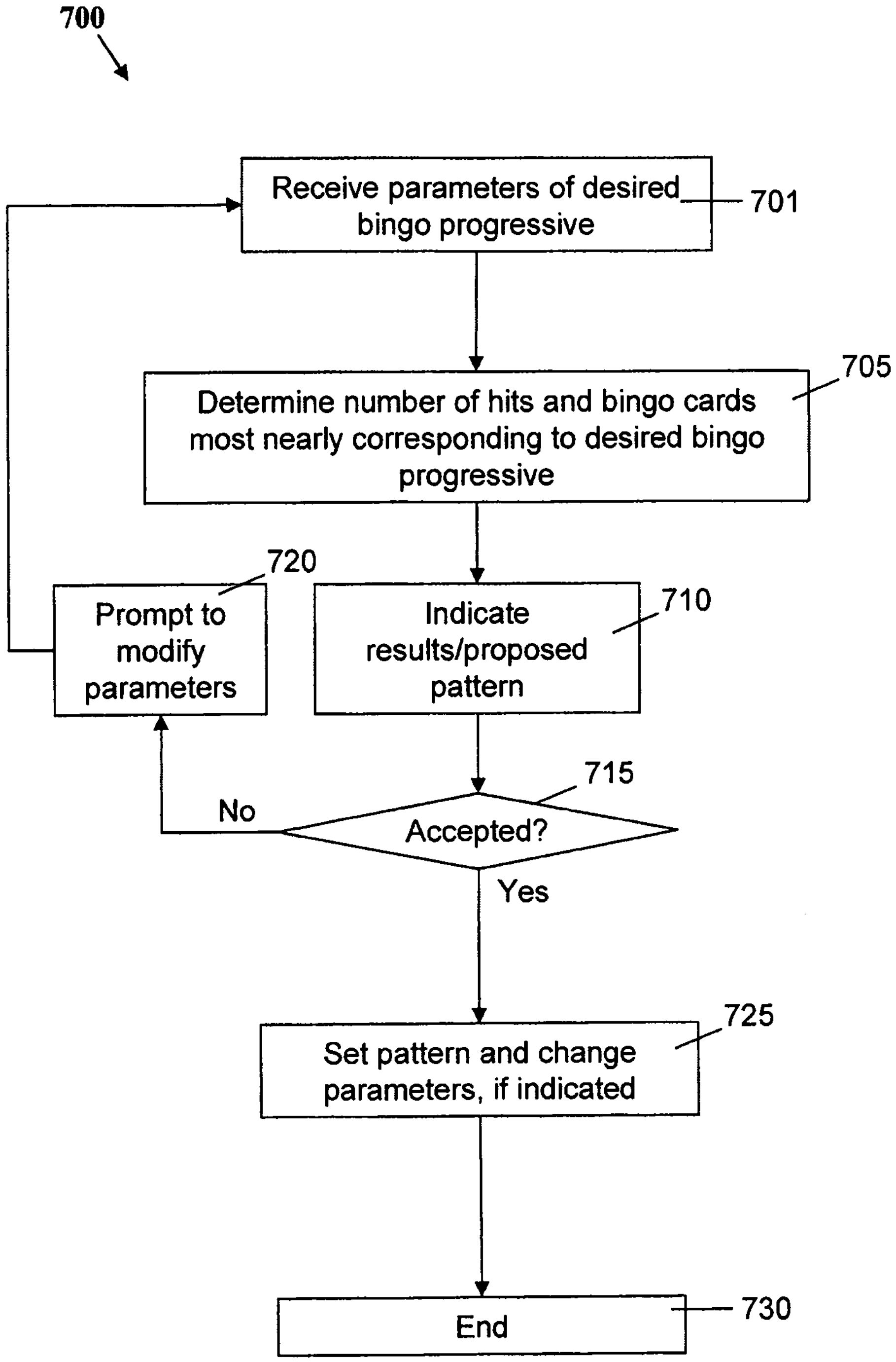
FIG. 7 is a flow chart that outlines some methods of the invention.

FIG. 7 is a flow chart that depicts steps of some related implementations of the invention. In step 701, parameters are received for a desired bingo progressive. For example, the desired size of the progressive, the desired probability of the progressive, bet size, contribution rate, number of bingo cards played, bingo card size, etc., may be indicated. Such parameters may be received via a GUI or other user input device, a network interface, etc.

In step 705, the parameters of a progressive that most nearly matches the desired progressive are determined (e.g., by logic system 448 of FIG. 4B, by reference to one or more data structures stored in memory 446). The results are indicated in step 710 (e.g., on display 450 of FIG. 4B, according to instructions from logic system 448).

In one example, step 701 involves receiving an indication of a desired probability of winning a progressive award in a bingo game involving a predetermined number of bingo cards. Step 705 may involve determining a number M of hits on R of the bingo cards that will provide an actual probability of winning the progressive award that approximates the desired probability. In some instances, R may be greater than 1. Step 710 may involve indicating M and R. When each of the bingo cards indicates N bingo numbers, M may be greater than N.

Step 710 may also involve indicating an expected average progressive size, given the actual probability, a wager size and a contribution percentage. Step 710 may also involve indicating one or more proposed M-hit pattern shapes. If the parameters are not accepted, a prompt may be provided to indicate modified parameters, e.g., a different desired progressive size and/or probability, a different contribution percentage, etc.

If the parameters indicated in step 710 are accepted, the patterns may be set for the bingo game. (Step 725.) Other parameters of the bingo game (such as contribution percentage, required wager size for a progressive award, etc.) may be changed, if necessary. The process ends in step 730.

FIG. 8 indicates some additional examples of data structures that may be useful for some implementations of the invention. As before, these data structures apply to a four-card bingo game, but other implementations apply to other numbers of bingo cards played.

In area 805, the total balls, balls drawn, card size (number of "spots" or bingo numbers) and maximum number of cards playable are indicated. In some implementations of the invention, a display (e.g., display device 450 of FIG. 4B) may indicate one or more of data structures 805, 810, 815, 820 or similar data structures.

For example, a user may modify one or more of the total balls, balls drawn and/or card size fields (e.g., by interacting with a GUI on display device 450 and/or by interacting with user input system 452) and other related parameters will be automatically re-calculated and displayed (e.g., according to instructions from logic system 448). In other implementations, the "max cards" field may also be modified. Related parameters will be re-calculated automatically.

In another example, a user may alter one or more of the fields in area 810. For example, a user may change the value of the pattern size in area 810 and/or the number of cards on which a pattern must be obtained for a progressive award and the pattern, description, odds and average award fields may automatically be re-calculated and displayed. Similarly, a user may wish to determine how the average progressive award size (or other parameters) may change if one or more of the denomination field, required cards bet field, required bet per card field, percent contribution field and/or the portion to main progressive pool field of area 815 were modified.

Area 820 indicates data regarding estimated contributions from players at various wager levels. In this example, the percentage of each wager applied to progressive 1 and progressive 2 does not vary according to wager level. (As noted in area 815.) The contribution level changes only because the wager level changes. However, a player must wager 10 credits on each of 4 cards to be eligible for progressive 1. This means that players who wager from 1 to 9 credits per bingo card contribute to progressive 1, but are not eligible to obtain the progressive award even if they hit the required pattern on the required number of cards.

Accordingly, changes to the "percent of play" values for the various wagering levels of area 820 will affect the expected average size of a progressive bonus. In some implementations, a user may interact with a GUI (or the like) to determine relevant sensitivities. In some implementations, actual wager data may be acquired, stored and used as input for the "percent of play" fields. Based on such wagering data, a casino may alter parameters such as minimum wager for a progressive, contribution percentage, etc.

It is desirable to have as many gaming machines as possible participating in the same bingo game. Having a large number of participating gaming machines allows larger jackpots to accumulate and reduces the time that players spend waiting for additional players. Therefore, some implementations provide a system wherein a plurality of electronic gaming machines are configured for communication with a central system that includes, e.g. a bingo server, a progressive server, etc. By linking many participating electronic gaming machines to a single server, some implementations of the invention allow progressive contributions from all of the participating electronic gaming machines to be pooled into one or more progressive jackpot.

Alternatively, or additionally, the game theme of a particular networked gaming machine (or a group of networked gaming machines) may be changed according to instructions received from a central system: some gaming networks described herein include a central system that is configured to download game software and data, including but not limited to the underlying bingo patterns, pays and game outcomes, to networked gaming machines. Such gaming networks allow for the convenient provisioning of networked gaming machines.

Moreover, such gaming networks allow additional game themes to be easily and conveniently added, if desired. Related software, including but not limited to game software, may be downloaded to networked gaming machines. Relevant information is set forth in U.S. patent application Ser. No. 11/225,407, by Wolf et al., entitled "METHODS AND DEVICES FOR MANAGING GAMING NETWORKS" and filed Sep. 12, 2005, in U.S. patent application Ser. No. 10/757,609 by Nelson et al., entitled "METHODS AND APPARATUS FOR GAMING DATA DOWNLOADING" and filed on Jan. 14, 2004, in U.S. patent application Ser. No. 10/938,293 by Benbrahim et al., entitled "METHODS AND APPARATUS FOR DATA COMMUNICATION IN A GAMING SYSTEM" and filed on Sep. 10, 2004, in U.S. patent application Ser. No. 11/225,337 by Nguyen et al., filed Sep. 12, 2005 and entitled "DISTRIBUTED GAME SERVICES" and in U.S. patent application Ser. No. 11/173,442 by Kinsley et al., filed Jul. 1, 2005 and entitled "METHODS AND DEVICES FOR DOWNLOADING GAMES OF CHANCE," all of which are hereby incorporated by reference in their entirety and for all purposes. Some exemplary gaming networks and devices are below.

Exemplary System Architecture

Figure 9:
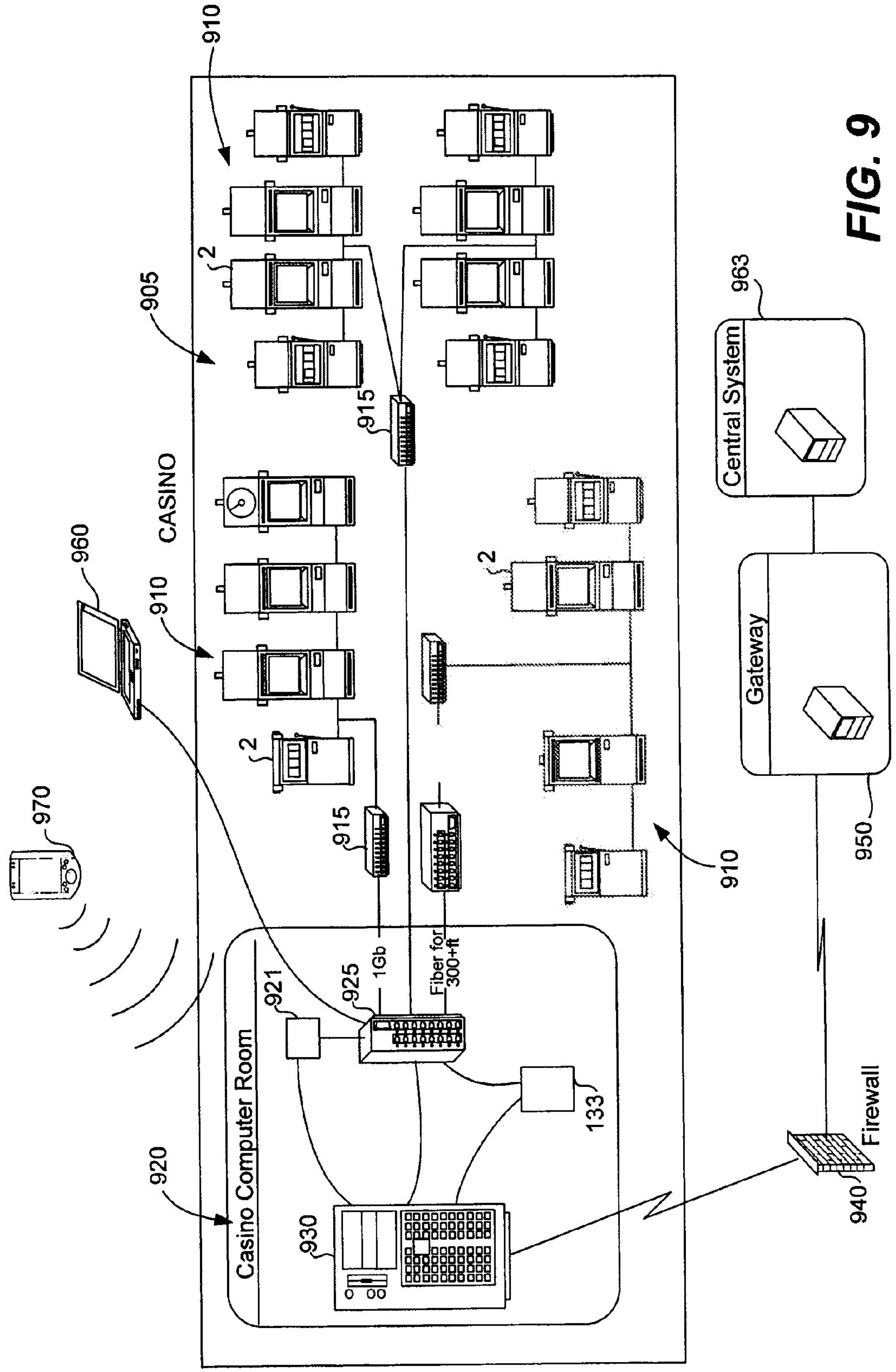
FIG. 9 illustrates one example of a network topology for implementing some aspects of the present invention.

One example of a network topology for implementing some aspects of the present invention is shown in FIG. 9. Those of skill in the art will realize that this exemplary architecture and the related functionality are merely examples and that the present invention encompasses many other such embodiments and methods. Here, for example, a single gaming establishment 905 is illustrated, which is a casino in this example. However, it should be understood that some implementations of the present invention involve multiple gaming establishments.

Gaming establishment 905 includes 16 gaming machines 2, each of which is part of a bank 910 of gaming machines 2. It will be appreciated that many gaming establishments include hundreds or even thousands of gaming machines 2, not all of which are included in a bank 910. However, the present invention may be implemented in gaming establishments having any number of gaming machines.

Various alternative network topologies can be used to implement different aspects of the invention and/or to accommodate varying numbers of networked devices. For example, gaming establishments with very large numbers of gaming machines 2 may require multiple instances of some network devices (e.g., of main network device 925, which combines switching and routing functionality in this example) and/or the inclusion of other network devices not shown in FIG. 9. For example, some implementations of the invention include one or more middleware servers disposed between gaming machines 2 and server 930. Such middleware servers can provide various useful functions, including but not limited to the filtering and/or aggregation of data received from bank switches 915, from individual gaming machines and from other player terminals. Some implementations of the invention include load balancing methods and devices for managing network traffic.

Each bank 910 has a corresponding bank switch 915, which may be a conventional bank switch. Each bank switch is connected to server-based gaming ("SBG") server 930 via main network device 925, which combines switching and routing functionality in this example. Although various floor communication protocols may be used, some preferred implementations use IGT's open, Ethernet-based SuperSAS® protocol, which IGT makes available for downloading without charge. However, other protocols such as Best of Breed ("BOB") may be used to implement various aspects of SBG. IGT has also developed a gaming-industry-specific transport layer called CASH that rides on top of TCP/IP and offers additional functionality and security.

SBG server 930, License Manager 931, Arbiter 133 and main network device 925 are disposed within computer room 920 of gaming establishment 905. License Manager 931 may be implemented, at least in part, via a server or a similar device. Some exemplary operations of License Manager 931 are described in detail in U.S. patent application Ser. No. 11/225,408, entitled "METHODS AND DEVICES FOR AUTHENTICATION AND LICENSING IN A GAMING NETWORK" by Kinsley et al., which is hereby incorporated by reference.

SBG server 930 can be configured to implement, at least in part, various aspects of the present invention. Some preferred embodiments of SBG server 930 include (or are at least in communication with) clustered CPUs, redundant storage devices, including backup storage devices, switches, etc. Such storage devices may include a redundant array of inexpensive disks ("RAID"), back-up hard drives and/or tape drives, etc. Preferably, a Radius and a DHCP server are also configured for communication with the gaming network.

One or more servers (and/or other devices) may be used to implement accounting functions, game functions (e.g., providing bingo games and related features described herein), gaming machine provisioning functions, bonus functions, including but not limited to progressive bonus functions, etc. Some implementations of the invention provide one or more of these servers in the form of blade servers.

In some implementations of the invention, many of these devices (including but not limited to License Manager 931 and main network device 925) are mounted in a single rack with SBG server 930. Accordingly, many or all such devices will sometimes be referenced in the aggregate as an "SBG server." However, in alternative implementations, one or more of these devices is in communication with SBG server 930 but located elsewhere. For example, some of the devices could be mounted in separate racks within computer room 920 or located elsewhere on the network. For example, it can be advantageous to store large volumes of data elsewhere via a storage area network ("SAN").

In some embodiments, these components are SBG server 930 preferably has an uninterruptible power supply ("UPS"). The UPS may be, for example, a rack-mounted UPS module.

Computer room 920 may include one or more operator consoles or other host devices that are configured for communication with SBG server 930. Such host devices may be provided with software, hardware and/or firmware for implementing various aspects of the invention; many of these aspects involve controlling SBG server 930. However, such host devices need not be located within computer room 920. Wired host device 960 (which is a laptop computer in this example) and wireless host device (which is a PDA in this example) may be located elsewhere in gaming establishment 905 or at a remote location.

Arbiter 133 may be implemented, for example, via software that is running on a server or another networked device. Arbiter 133 serves as an intermediary between different devices on the network. Some implementations of Arbiter 133 are described in U.S. patent application Ser. No. 10/948,387, entitled "METHODS AND APPARATUS FOR NEGOTIATING COMMUNICATIONS WITHIN A GAMING NETWORK" and filed Sep. 23, 2004 (the "Arbiter Application"), which is incorporated herein by reference and for all purposes. In some preferred implementations, Arbiter 133 is a repository for the configuration information required for communication between devices on the gaming network (and, in some implementations, devices outside the gaming network). Although Arbiter 133 can be implemented in various ways, one exemplary implementation is discussed in the following paragraphs.

Figure 9A:
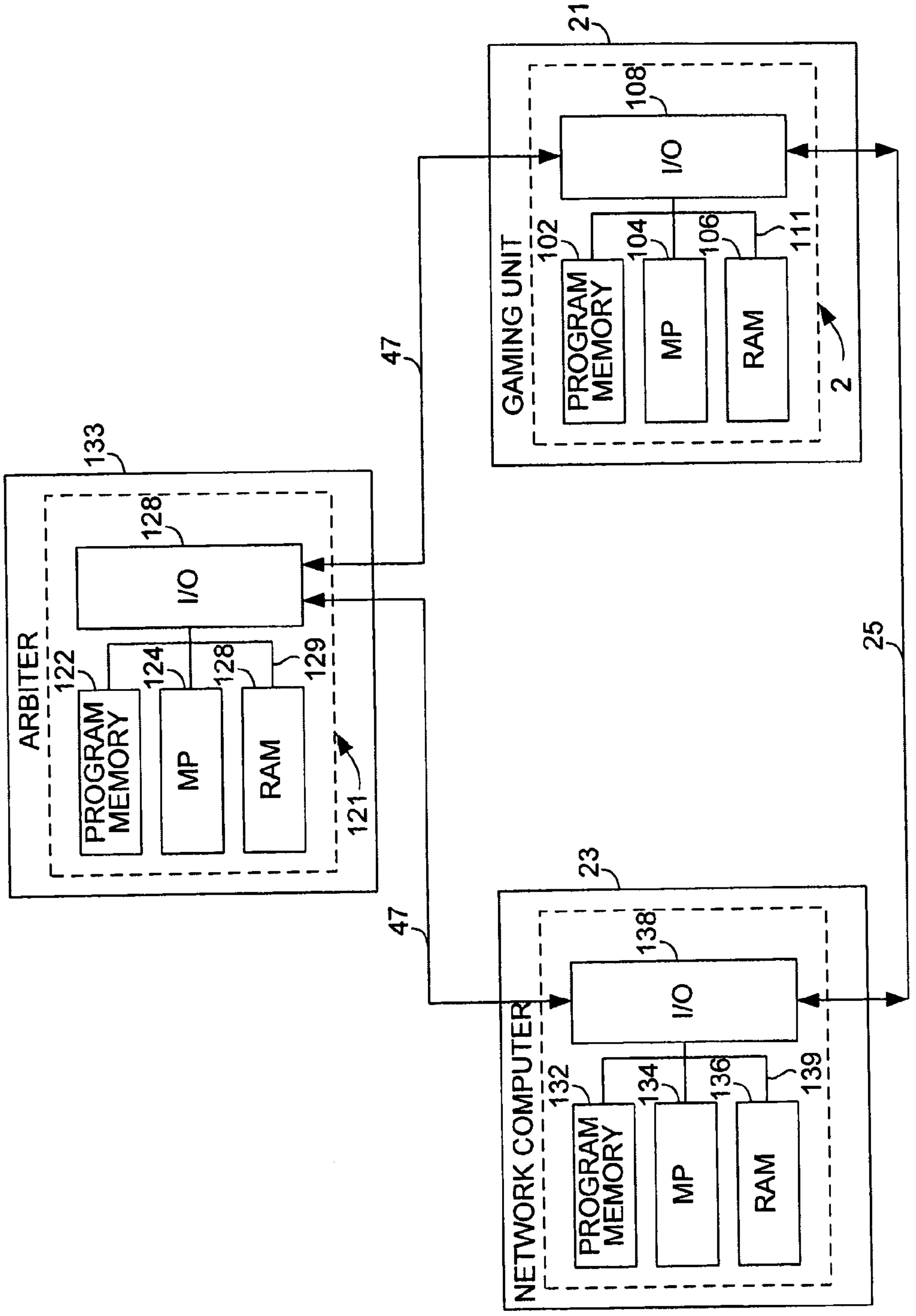
FIG. 9A is a block diagram that illustrates a simplified network topology that illustrates some implementations of an Arbiter.

FIG. 9A is a block diagram of a simplified communication topology between a gaming unit 21, the network computer 23 and the Arbiter 133. Although only one gaming unit 21, one network computer 23 and one Arbiter 133 are shown in FIG. 9A, it should be understood that the following examples may be applicable to different types of network gaming devices within the gaming network 12 beyond the gaming unit 21 and the network computer 23, and may include different numbers of network computers, gaming security arbiters and gaming units. For example, a single Arbiter 133 may be used for secure communications among a plurality of network computers 23 and tens, hundreds or thousands of gaming units 21. Likewise, multiple gaming security arbiters 46 may be utilized for improved performance and other scalability factors.

Referring to FIG. 9A, the Arbiter 133 may include an arbiter controller 121 that may comprise a program memory 122, a microcontroller or microprocessor (MP) 124, a random-access memory (RAM) 126 and an input/output (I/O) circuit 128, all of which may be interconnected via an address/data bus 129. The network computer 23 may also include a controller 131 that may comprise a program memory 132, a microcontroller or microprocessor (MP) 134, a random-access memory (RAM) 136 and an input/output (I/O) circuit 138, all of which may be interconnected via an address/data bus 139. It should be appreciated that although the Arbiter 133 and the network computer 23 are each shown with only one microprocessor 124, 134, the controllers 121, 131 may each include multiple microprocessors 124, 134. Similarly, the memory of the controllers 121, 131 may include multiple RAMs 126, 136 and multiple program memories 122, 132. Although the I/O circuits 128, 138 are each shown as a single block, it should be appreciated that the I/O circuits 128, 138 may include a number of different types of I/O circuits. The RAMs 124, 134 and program memories 122, 132 may be implemented as semiconductor memories, magnetically readable memories, and/or optically readable memories, for example.

Although the program memories 122, 132 are shown in FIG. 9A as read-only memories (ROM) 122, 132, the program memories of the controllers 121, 131 may be a read/write or alterable memory, such as a hard disk. In the event a hard disk is used as a program memory, the address/data buses 129, 139 shown schematically in FIG. 9A may each comprise multiple address/data buses, which may be of different types, and there may be an I/O circuit disposed between the address/data buses.

As shown in FIG. 9A, the gaming unit 21 may be operatively coupled to the network computer 23 via the data link 25. The gaming unit 21 may also be operatively coupled to the Arbiter 133 via the data link 47, and the network computer 23 may likewise be operatively coupled to the Arbiter 133 via the data link 47. Communications between the gaming unit 21 and the network computer 23 may involve different information types of varying levels of sensitivity resulting in varying levels of encryption techniques depending on the sensitivity of the information. For example, communications such as drink orders and statistical information may be considered less sensitive. A drink order or statistical information may remain encrypted, although with moderately secure encryption techniques, such as RC4, resulting in less processing power and less time for encryption. On the other hand, financial information (e.g., account information, winnings, etc.), game download information (e.g., game software and game licensing information) and personal information (e.g., social security number, personal preferences, etc.) may be encrypted with stronger encryption techniques such as DES or 3DES to provide increased security.

As disclosed in further detail in the Arbiter Application, the Arbiter 133 may verify the authenticity of each network gaming device. The Arbiter 133 may receive a request for a communication session from a network device. For ease of explanation, the requesting network device may be referred to as the client, and the requested network device may be referred to as the host. The client may be any device on the network 12 and the request may be for a communication session with any other network device. The client may specify the host, or the gaming security arbiter may select the host based on the request and based on information about the client and potential hosts. The Arbiter 133 may provide encryption keys (session keys) for the communication session to the client via the secure communication channel. Either the host and/or the session key may be provided in response to the request, or may have been previously provided. The client may contact the host to initiate the communication session. The host may then contact the Arbiter 133 to determine the authenticity of the client. The Arbiter 133 may provide affirmation (or lack thereof) of the authenticity of the client to the host and provide a corresponding session key, in response to which the network devices may initiate the communication session directly with each other using the session keys to encrypt and decrypt messages.

Alternatively, upon receiving a request for a communication session, the Arbiter 133 may contact the host regarding the request and provide corresponding session keys to both the client and the host. The Arbiter 133 may then initiate either the client or the host to begin their communication session. In turn, the client and host may begin the communication session directly with each other using the session keys to encrypt and decrypt messages. An additional explanation of the communication request, communication response and key distribution is provided in the Arbiter Application.

Wireless devices are particularly useful for managing a gaming network. Such wireless devices could include, but are not limited to, laptops, PDAs or even cellular telephones. Referring once again to FIG. 9, one or more network devices in gaming establishment 905 can be configured as wireless access points. For example, a casino manager may use a wireless handheld device to revise and/or schedule gaming machine configurations while roaming the casino floor. Similarly, a representative of a regulatory body could use a PDA to verify gaming machine configurations, generate reports, view activity logs, etc., while on the casino floor.

If a host device is located in a remote location, security methods and devices (such as firewalls, authentication and/or encryption) should be deployed in order to prevent the unauthorized access of the gaming network. Similarly, any other connection between gaming network 905 and the outside world should only be made with trusted devices via a secure link, e.g., via a virtual private network ("VPN") tunnel. For example, the illustrated connection between SBG 930, gateway 950 and central system 963 (here, IGT.com) that may be used for game downloads, etc., is advantageously made via a VPN tunnel.

An Internet-based VPN uses the open, distributed infrastructure of the Internet to transmit data between sites. A VPN may emulate a private IP network over public or shared infrastructures. A VPN that supports only IP traffic is called an IP-VPN. VPNs provide advantages to both the service provider and its customers. For its customers, a VPN can extend the IP capabilities of a corporate site to remote offices and/or users with intranet, extranet, and dial-up services. This connectivity may be achieved at a lower cost to the gaming entity with savings in capital equipment, operations, and services. Details of VPN methods that may be used with the present invention are described in the reference, "Virtual Private Networks-Technologies and Solutions," by R. Yueh and T. Strayer, Addison-Wesley, 2001, ISBN#0-201-70209-6, which is incorporated herein by reference and for all purposes.

There are many ways in which IP VPN services may be implemented, such as, for example, Virtual Leased Lines, Virtual Private Routed Networks, Virtual Private Dial Networks, Virtual Private LAN Segments, etc. Additionally VPNs may be implemented using a variety of protocols, such as, for example, IP Security (IPSec) Protocol, Layer 2 Tunneling Protocol, Multiprotocol Label Switching (MPLS) Protocol, etc. Details of these protocols, including RFC reports, may be obtained from the VPN Consortium, an industry trade group (http://www.vpnc.com, VPNC, Santa Cruz, Calif.).

For security purposes, any information transmitted to or from a gaming establishment over a public network may be encrypted. In one implementation, the information may be symmetrically encrypted using a symmetric encryption key, where the symmetric encryption key is asymmetrically encrypted using a private key. The public key may be obtained from a remote public key server. The encryption algorithm may reside in processor logic stored on the gaming machine. When a remote server receives a message containing the encrypted data, the symmetric encryption key is decrypted with a private key residing on the remote server and the symmetrically encrypted information sent from the gaming machine is decrypted using the symmetric encryption key. A different symmetric encryption key is used for each transaction where the key is randomly generated. Symmetric encryption and decryption is preferably applied to most information because symmetric encryption algorithms tend to be 100-10,000 faster than asymmetric encryption algorithms.

As mentioned elsewhere herein, U.S. patent application Ser. No. 11/225,408, entitled "METHODS AND DEVICES FOR AUTHENTICATION AND LICENSING IN A GAMING NETWORK" by Kinsley et al., describes novel methods and devices for authentication, game downloading and game license management. This application has been incorporated herein by reference.

Providing a secure connection between the local devices of the SBG system and IGT's central system allows for the deployment of many advantageous features. For example, a customer (e.g., an employee of a gaming establishment) can log onto an account of central system 963 (in this example, IGT.com) to obtain the account information such as the customer's current and prior account status.

Moreover, such a secure connection may be used by the central system 963 to collect information regarding a customer's system. Such information includes, but is not limited to, error logs for use in diagnostics and troubleshooting. Some implementations of the invention allow a central system to collect other types of information, e.g., information about the usage of certain types of gaming software, revenue information regarding certain types of games and/or gaming machines, etc. Such information includes, but is not limited to, information regarding the revenue attributable to particular games at specific times of day, days of the week, etc. Such information may be obtained, at least in part, by reference to an accounting system of the gaming network(s), as described in U.S. patent application Ser. No. 11/225,407, by Wolf et al., entitled "METHODS AND DEVICES FOR MANAGING GAMING NETWORKS," which has been incorporated herein by reference.

Automatic updates of a customer's SBG server may also be enabled. For example, central system 963 may notify a local SBG server regarding new products and/or product updates. For example, central system 963 may notify a local SBG server regarding updates of new gaming software, gaming software updates, peripheral updates, the status of current gaming software licenses, etc. In some implementations of the invention, central system 963 may notify a local SBG server (or another device associated with a gaming establishment) that an additional theme-specific data set and/or updates for a previously-downloaded global payout set are available. Alternatively, such updates could be automatically provided to the local SBG server and downloaded to networked gaming machines.

After the local SBG server receives this information, it can identify relevant products of interest. For example, the local SBG server may identify gaming software that is currently in use (or at least licensed) by the relevant gaming entity and send a notification to one or more host devices, e.g., via email. If an update or a new software product is desired, it can be downloaded from the central system. Some relevant downloading methods are described elsewhere herein and in applications that have been incorporated herein by reference, e.g., in U.S. patent application Ser. No. 11/078,966. Similarly, a customer may choose to renew a gaming software license via a secure connection with central system 963 in response to such a notification.

Secure communication links allow notifications to be sent securely from a local SBG server to host devices outside of a gaming establishment. For example, a local SBG server can be configured to transmit automatically generated email reports, text messages, etc., based on predetermined events that will sometimes be referred to herein as "triggers." Such triggers can include, but are not limited to, the condition of a gaming machine door being open, cash box full, machine not responding, verification failure, etc.

In addition, providing secure connections between different gaming establishments can enable alternative implementations of the invention. For example, a number of gaming establishments, each with a relatively small number of gaming machines, may be owned and/or controlled by the same entity. In such situations, having secure communications between gaming establishments makes it possible for a gaming entity to use a single SBG server as an interface between central system 963 and the gaming establishments.

Figure 10:
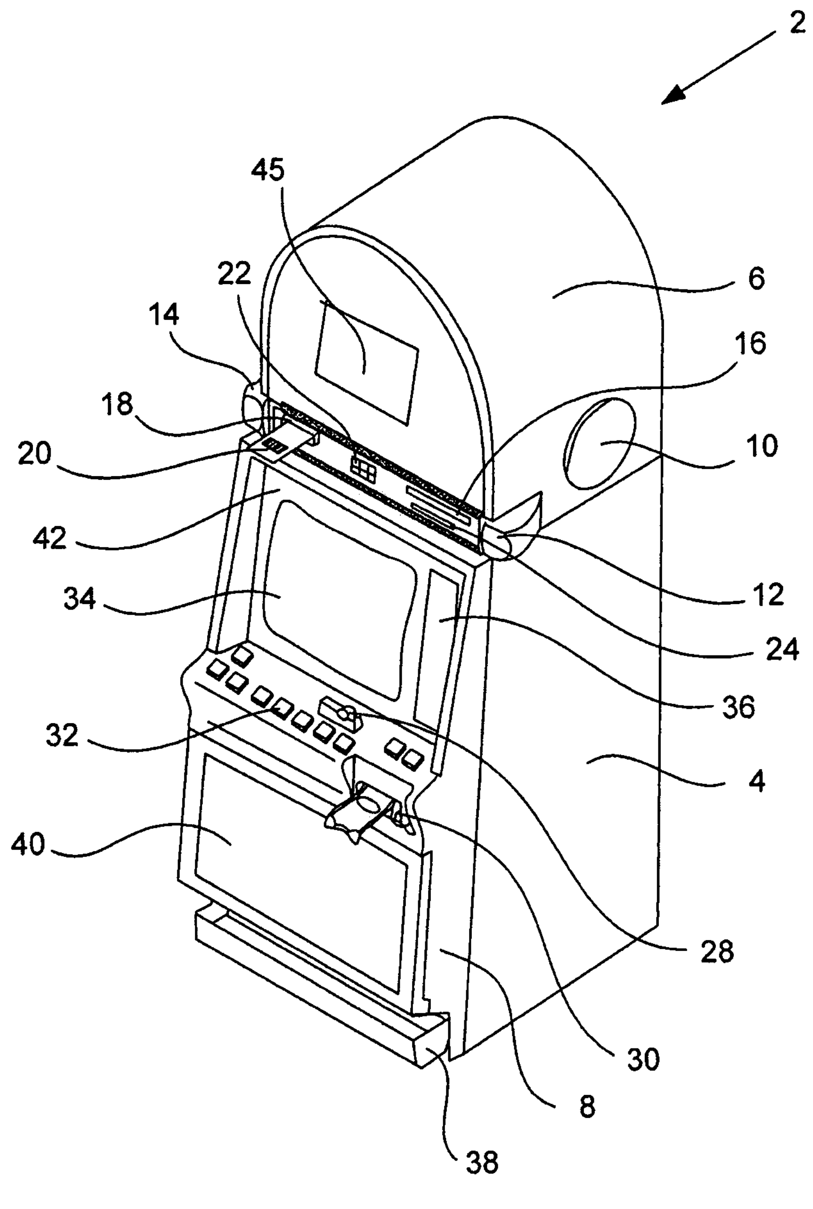
FIG. 10 illustrates a gaming machine that may be configured according to some aspects of the invention.

Turning next to FIG. 10, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in FIG. 10. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as IGT gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 10, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions that affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 11:
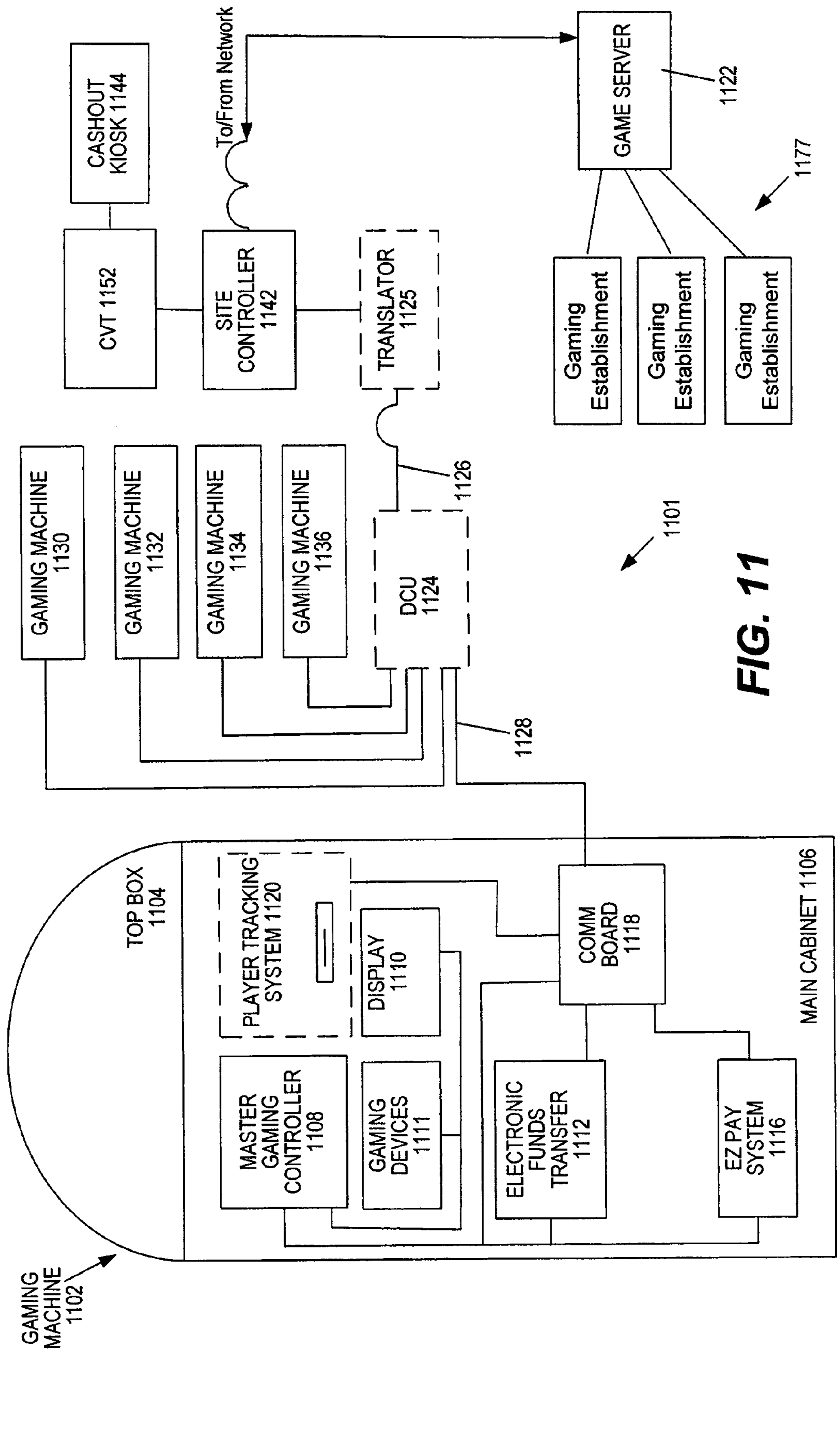
FIG. 11 illustrates a gaming machine and a gaming network that may be configured according to some aspects of the invention.

A gaming network that may be used to implement additional methods performed in accordance with embodiments of the invention is depicted in FIG. 11. Gaming establishment 1101 could be any sort of gaming establishment, such as a casino, a card room, an airport, a store, etc. In this example, gaming network 1177 includes more than one gaming establishment, all of which are networked to game server 1122.

Here, gaming machine 1102, and the other gaming machines 1130, 1132, 1134, and 1136, include a main cabinet 1106 and a top box 1104. The main cabinet 1106 houses the main gaming elements and can also house peripheral systems, such as those that utilize dedicated gaming networks. The top box 1104 may also be used to house these peripheral systems.

The master gaming controller 1108 controls the game play on the gaming machine 1102 according to instructions and/or game data from game server 1122 or stored within gaming machine 1102 and receives or sends data to various input/output devices 1111 on the gaming machine 1102. In one embodiment, master gaming controller 1108 includes processor(s) and other apparatus of the gaming machines described above in FIGS. 6 and 7. The master gaming controller 1108 may also communicate with a display 1110.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 1108 may also communicate with EFT system 1112, EZPay™ system 1116 (a proprietary cashless ticketing system of the present assignee), and player tracking system 1120. The systems of the gaming machine 1102 communicate the data onto the network 1122 via a communication board 1118.

It will be appreciated by those of skill in the art that embodiments of the present invention could be implemented on a network with more or fewer elements than are depicted in FIG. 11. For example, player tracking system 1120 is not a necessary feature of some implementations of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Moreover, player tracking information may be combined with other information that is now readily obtainable by an SBG system.

Moreover, DCU 1124 and translator 1125 are not required for all gaming establishments 1101. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, in the gaming industry, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machines are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 1142 provides this function for gaming establishment 1101. Site controller 1142 is connected to a central system and/or other gaming establishments via one or more networks, which may be public or private networks. Among other things, site controller 1142 communicates with game server 1122 to obtain game data, such as ball drop data, bingo card data, etc.

In the present illustration, gaming machines 1102, 1130, 1132, 1134 and 1136 are connected to a dedicated gaming network 1122. In general, the DCU 1124 functions as an intermediary between the different gaming machines on the network 1122 and the site controller 1142. In general, the DCU 1124 receives data transmitted from the gaming machines and sends the data to the site controller 1142 over a transmission path 1126. In some instances, when the hardware interface used by the gaming machine is not compatible with site controller 1142, a translator 1125 may be used to convert serial data from the DCU 1124 to a format accepted by site controller 1142. The translator may provide this conversion service to a plurality of DCUs.

Further, in some dedicated gaming networks, the DCU 1124 can receive data transmitted from site controller 1142 for communication to the gaming machines on the gaming network. The received data may be, for example, communicated synchronously to the gaming machines on the gaming network.

Here, CVT 1152 provides cashless and cashout gaming services to the gaming machines in gaming establishment 1101. Broadly speaking, CVT 1152 authorizes and validates cashless gaming machine instruments (also referred to herein as "tickets" or "vouchers"), including but not limited to tickets for causing a gaming machine to display a game result and cash-out tickets. Moreover, CVT 1152 authorizes the exchange of a cashout ticket for cash. These processes will be described in detail below. In one example, when a player attempts to redeem a cash-out ticket for cash at cashout kiosk 1144, cash out kiosk 1144 reads validation data from the cashout ticket and transmits the validation data to CVT 1152 for validation. The tickets may be printed by gaming machines, by cashout kiosk 1144, by a stand-alone printer, by CVT 1152, etc. Some gaming establishments will not have a cashout kiosk 1144. Instead, a cashout ticket could be redeemed for cash by a cashier (e.g. of a convenience store), by a gaming machine or by a specially configured CVT.

Figure 12:
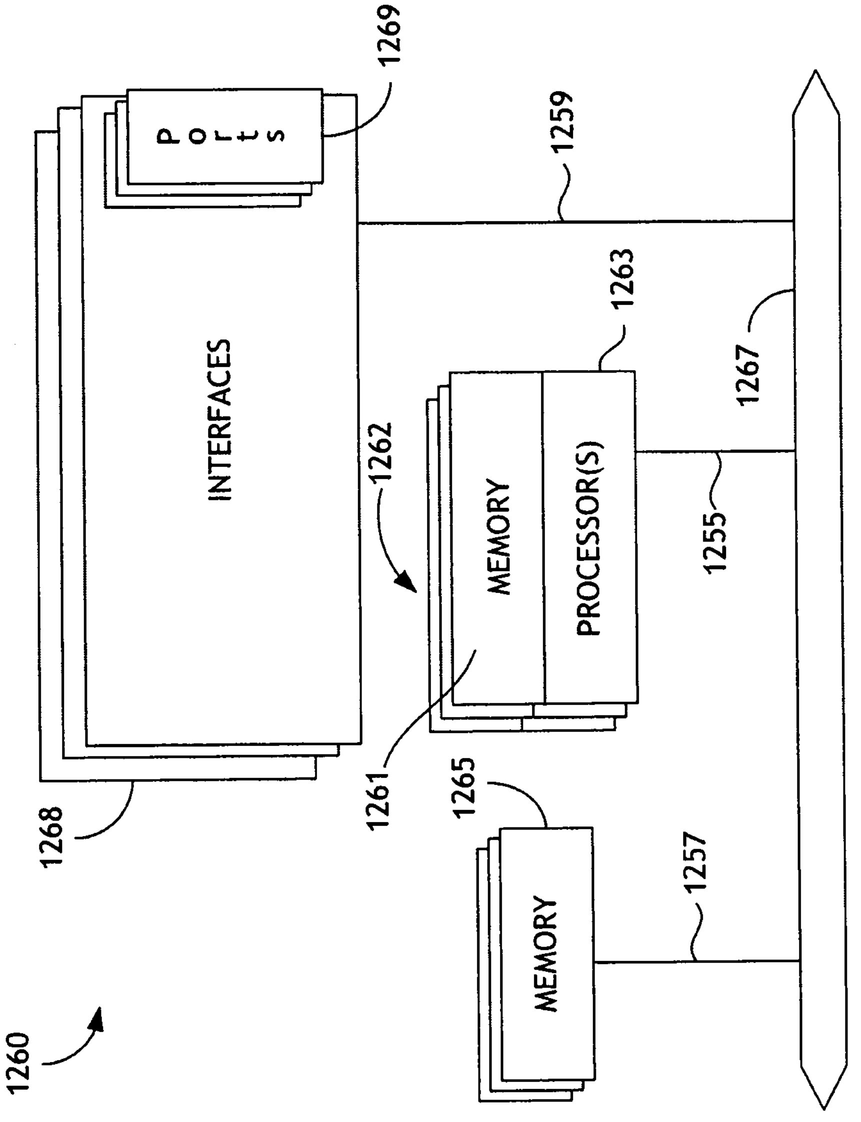
FIG. 12 illustrates a network device that may be configured according to some aspects of the invention.

FIG. 12 illustrates an example of a network device that may be configured for implementing some methods of the present invention. Network device 1260 includes a master central processing unit (CPU) 1262, interfaces 1268, and a bus 1267 (e.g., a PCI bus). Generally, interfaces 1268 include ports 1269 appropriate for communication with the appropriate media. In some embodiments, one or more of interfaces 1268 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1268 control such communications-intensive tasks as encryption, decryption, compression, decompression, packetization, media control and management. By providing separate processors for the communications-intensive tasks, interfaces 1268 allow the master microprocessor 1262 efficiently to perform other functions such as routing computations, network diagnostics, security functions, etc.

The interfaces 1268 are typically provided as interface cards (sometimes referred to as "linecards"). Generally, interfaces 1268 control the sending and receiving of data packets over the network and sometimes support other peripherals used with the network device 1260. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1262 may be responsible for implementing specific functions associated with the functions of a desired network device. According to some embodiments, CPU 1262 accomplishes all these functions under the control of software including an operating system and any appropriate applications software.

CPU 1262 may include one or more processors 1263 such as a processor from the Motorola family of microprocessors or the MIPS family of microprocessors. In an alternative embodiment, processor 1263 is specially designed hardware for controlling the operations of network device 1260. In a specific embodiment, a memory 1261 (such as non-volatile RAM and/or ROM) also forms part of CPU 1262. However, there are many different ways in which memory could be coupled to the system. Memory block 1261 may be used for a variety of purposes such as, for example, caching and/or storing data, programming instructions, etc.

Regardless of the network device's configuration, it may employ one or more memories or memory modules (such as, for example, memory block 1265) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 12 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 12) or switch fabric based (such as a cross-bar).

The above-described devices and materials will be familiar to those of skill in the computer hardware and software arts. Although many of the components and processes are described above in the singular for convenience, it will be appreciated by one of skill in the art that multiple components and repeated processes can also be used to practice the techniques of the present invention.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the present embodiments are to be considered as illustrative and not restrictive, and the invention is not to be limited to the details given herein, but may be modified within the scope and equivalents of the appended claims.

We claim:

1. An apparatus for controlling a bingo paytable percentage, comprising:

a network interface; and a logic system comprising at least one logic device, the logic system configured to do the following:

determine a first bingo paytable percentage for a theoretical first bingo game involving a selection of N bingo numbers;

determine a second bingo paytable percentage for a theoretical second bingo game involving a selection of N+1 bingo numbers;

obtain a desired third bingo paytable percentage for an active bingo game involving a selection of N bingo numbers and a potential award of a free $(N+1)^{th}$ bingo number to a player in the bingo third game, the desired third bingo paytable percentage higher than the first bingo paytable percentage;

determine a probability of awarding the free $(N+1)^{th}$ bingo number to the player in the active bingo game, the probability determined, at least in part, by dividing a first difference by a second difference, the first difference calculated by subtracting the first bingo paytable percentage from the desired third bingo paytable percentage, and the second difference calculated by subtracting the first paytable percentage from the second paytable percentage; and provide an indication of the probability.

2. The apparatus of claim 1, further comprising a display device and wherein the logic system is further configured to provide, via the display device, a graphical user interface ("GUI") configured to receive input, wherein the desired third bingo paytable percentage for the active bingo game is determined from the input received via the GUI.

3. The apparatus of claim 2, wherein the logic system is further configured to control the display device to provide the indication of the probability.

4. The apparatus of claim 1, wherein the logic system is further configured to receive data indicating the desired third bingo paytable percentage from the network interface, wherein the desired third bingo paytable percentage for the active bingo game is determined from the data received.

5. The apparatus of claim 1, further comprising a server configured to provide, at least in part, the active bingo game.

6. The apparatus of claim 5, further comprising a random number generator configured to determine when to award the free $(N+1)^{th}$ bingo number to a player according to the indicated probability.

7. The apparatus of claim 1, wherein the apparatus is configured to provide the indication of the probability to another device via the network interface.

8. The apparatus of claim 1, wherein the active bingo game is a multi-card bingo game.

9. The apparatus of claim 8, wherein each of the bingo cards provided to a player for a single instance of the multi-card bingo game indicate different bingo numbers from each of the other bingo cards provided to the player for the single instance of the multi-card bingo game.

10. A method of controlling a bingo paytable percentage, comprising:

determining a first bingo paytable percentage for a theoretical first bingo game involving a selection of N bingo numbers;

determining a second bingo paytable percentage for a theoretical second bingo game involving a selection of N+1 bingo numbers;

obtaining a desired third bingo paytable percentage for an active bingo game, the desired third bingo paytable percentage higher than the first bingo paytable percentage;

determining a probability of awarding a free $(N+1)^{th}$ bingo number to a player in the active bingo game, the probability determined, at least in part, by dividing a first difference by a second difference, the first difference calculated by subtracting the first bingo paytable percentage from the desired third bingo paytable percentage, and the second difference calculated by subtracting the first paytable percentage from the second paytable percentage; and configuring a gaming machine to:

provide instances of the active bingo game, and determine, for each provided instance of the active bingo game, whether to award the free $(N+1)^{th}$ bingo number according to the probability.

11. The method of claim 10, further comprising providing an indication of the probability.

12. The method of claim 10, further comprising:

providing the active bingo game; and awarding the free $(N+1)^{th}$ bingo numbers to players according to the probability.

13. The method of claim 12, wherein changing the bingo paytable percentage does not change winning patterns of the active bingo game.

14. The method of claim 13, wherein changing the bingo paytable percentage does not change a payout for any winning pattern of the active bingo game.

15. The method of claim 12, further comprising offering players at least one additional bingo number in exchange for an indicium of value.

16. The method of claim 12, further comprising offering players a plurality of additional bingo numbers in exchange for an indicium of value.

17. The method of claim 16, wherein the offering the players the plurality of additional bingo numbers in exchange for an indicium of value comprises offering the plurality of additional bingo numbers as a bulk purchase in exchange for a first amount and offering each additional bingo number in the plurality of additional bingo numbers for individual purchase, each individual purchase in exchange for a second amount, wherein the first amount is less than the sum of the second amounts for all of the additional bingo numbers.

18. The method of claim 10, further comprising receiving an indication of the value of N, wherein the determining the probability is based, at least in part, on the value of N.

19. The method of claim 10, further comprising receiving an indication of how many bingo numbers are used in the active bingo game, wherein the determining the probability step comprises determining the probability based, at least in part, on how many bingo numbers are used in the active bingo game.

20. The method of claim 10, further comprising receiving an indication of how many bingo cards are used in the active bingo game, wherein the determining the probability step further comprises determining the probability based, at least in part, on how many bingo cards are used in the bingo game.

21. The method of claim 20, further comprising determining how many spots are on the bingo cards used in the active bingo game, wherein the determining the probability step further comprises determining the probability based, at least in part, on how many spots are on the bingo cards.

22. A gaming system, comprising:

means for determining a first bingo paytable percentage for a theoretical first bingo game involving a selection of N bingo numbers;

means for determining a second bingo paytable percentage for a theoretical second bingo game involving a selection of N+1 bingo numbers;

means for obtaining a desired third bingo paytable percentage for an active bingo game involving a selection of N bingo numbers and a potential award of a free $(N+1)^{th}$ bingo number to a player in the bingo third game, the desired third bingo paytable percentage higher than the first bingo paytable percentage; and means for determining a probability of awarding the free $(N+1)^{th}$ bingo number to the player in the active bingo game, the probability determined, at least in part, by dividing a first difference by a second difference, the first difference calculated by subtracting the first bingo paytable percentage from the desired third bingo paytable percentage, and the second difference calculated by subtracting the first paytable percentage from the second paytable percentage.

23. The gaming system of claim 22, further comprising means for providing an indication of the probability.

24. The gaming system of claim 22, further comprising:

means for providing the active bingo game; and means for awarding the free $(N+1)^{th}$ bingo numbers to players according to the probability.

25. The gaming system of claim 24, further comprising means for offering players at least one additional bingo number in exchange for an indicium of value.

* * * * *

UNITED STATES PATENT AND TRADEMARK OFFICE

CERTIFICATE OF CORRECTION

PATENT NO. : 8,506,384 B2
APPLICATION NO. : 12/208252
DATED : August 13, 2013
INVENTOR(S) : James Coleman et al.

It is certified that error appears in the above-identified patent and that said Letters Patent is hereby corrected as shown below:

IN THE CLAIMS

In Claim 1, Column 32, Line 39, between “the” and “bingo” insert --active-- and delete “third”.
In Claim 1, Column 32, Line 40, between “percentage” and “higher” insert --being--.
In Claim 1, Column 32, Line 49, between “first” and “paytable” insert --bingo--.
In Claim 1, Column 32, Line 50, between “second” and “paytable” insert --bingo--.
In Claim 2, Column 32, Line 57, replace the first instance of “the” with --an--.
In Claim 6, Column 33, Line 3, replace “a” with --the--.
In Claim 9, Column 33, Line 10, delete “of the”.
In Claim 9, Column 33, Line 11, replace “cards” with --card-- and replace the first instance of “a” with --the--.
In Claim 9, Column 33, Line 12, replace “indicate” with --indicates--.
In Claim 9, Column 33, Line 13, delete “of the” and replace “cards” with --card--.
In Claim 10, Column 33, Line 25, before “higher” insert --being--.
In Claim 10, Column 33, Line 33, between “first” and “paytable” insert --bingo-- and between “second” and “paytable” insert --bingo--.
In Claim 17, Column 33, Line 58, delete the second instance of “the”.
In Claim 17, Column 33, Line 60, replace “an” with --the--.
In Claim 17, Column 34, Line 5, replace the second instance of “the” with --a--.
In Claim 18, Column 34, Line 8, replace the first instance of “the” with --a-- and delete the second instance of “the”.
In Claim 19, Column 34, Line 12, delete the first instance of “the”.
In Claim 19, Column 34, Line 13, delete “step”.
In Claim 20, Column 34, Line 19, delete the first instance of “the” and “step”.
In Claim 21, Column 34, Line 23, delete the first instance of “the”.
In Claim 21, Column 34, Line 24, delete the first instance of “the” and “step”.
In Claim 22, Column 34, Line 38, between “the” and “bingo” insert --active-- and delete “third”.
In Claim 22, Column 34, Line 39, between “percentage” and “higher” insert --being--.
In Claim 22, Column 3, Line 48, between “first” and “paytable” insert --bingo-- and after “second” insert --bingo--.

Signed and Sealed this
Twenty-ninth Day of April, 2014

Michelle K. Lee
*Deputy Director of the United States Patent and Trademark Office*

UNITED STATES PATENT AND TRADEMARK OFFICE

CERTIFICATE OF CORRECTION

PATENT NO. : 8,506,384 B2
APPLICATION NO. : 12/208252
DATED : August 13, 2013
INVENTOR(S) : James Coleman et al.

It is certified that error appears in the above-identified patent and that said Letters Patent is hereby corrected as shown below:

IN THE CLAIMS

In Claim 1, Column 32, Line 39, between “the” and “bingo” insert --active-- and delete “third”.
In Claim 1, Column 32, Line 40, between “percentage” and “higher” insert --being--.
In Claim 1, Column 32, Line 49, between “first” and “paytable” insert --bingo--.
In Claim 1, Column 32, Line 50, between “second” and “paytable” insert --bingo--.
In Claim 2, Column 32, Line 57, replace the first instance of “the” with --an--.
In Claim 6, Column 33, Line 3, replace “a” with --the--.
In Claim 9, Column 33, Line 10, delete “of the”.
In Claim 9, Column 33, Line 11, replace “cards” with --card-- and replace the first instance of “a” with --the--.
In Claim 9, Column 33, Line 12, replace “indicate” with --indicates--.
In Claim 9, Column 33, Line 13, delete “of the” and replace “cards” with --card--.
In Claim 10, Column 33, Line 25, before “higher” insert --being--.
In Claim 10, Column 33, Line 33, between “first” and “paytable” insert --bingo-- and between “second” and “paytable” insert --bingo--.
In Claim 17, Column 33, Line 58, delete the second instance of “the”.
In Claim 17, Column 33, Line 60, replace “an” with --the--.
In Claim 17, Column 34, Line 5, replace the second instance of “the” with --a--.
In Claim 18, Column 34, Line 8, replace the first instance of “the” with --a-- and delete the second instance of “the”.
In Claim 19, Column 34, Line 12, delete the first instance of “the”.
In Claim 19, Column 34, Line 13, delete “step”.
In Claim 20, Column 34, Line 19, delete the first instance of “the” and “step”.
In Claim 21, Column 34, Line 23, delete the first instance of “the”.
In Claim 21, Column 34, Line 24, delete the first instance of “the” and “step”.

This certificate supersedes the Certificate of Correction issued April 29, 2014.

Signed and Sealed this
Twentieth Day of May, 2014

Michelle K. Lee
*Deputy Director of the United States Patent and Trademark Office*

In Claim 22, Column 34, Line 38, between “the” and “bingo” insert --active-- and delete “third”.
In Claim 22, Column 34, Line 39, between “percentage” and “higher” insert --being--.
In Claim 22, Column 34, Line 48, between “first” and “paytable” insert --bingo-- and after “second” insert --bingo--.